US008385089B2

(12) United States Patent
Kyono

(10) Patent No.: US 8,385,089 B2
(45) Date of Patent: Feb. 26, 2013

(54) MULTIPLE-OUTPUT SWITCHING POWER SUPPLY UNIT

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 12/663,290

(22) PCT Filed: Jun. 6, 2008

(86) PCT No.: PCT/JP2008/060432
§ 371 (c)(1),
(2), (4) Date: Dec. 7, 2009

(87) PCT Pub. No.: WO2008/152978
PCT Pub. Date: Dec. 18, 2008

(65) Prior Publication Data
US 2010/0172159 A1    Jul. 8, 2010

(30) Foreign Application Priority Data
Jun. 11, 2007 (JP) ................................. 2007-153913

(51) Int. Cl.
*H02M 3/335* (2006.01)
*H02M 3/338* (2006.01)
(52) U.S. Cl. ................ 363/21.17; 363/21.02; 363/93
(58) Field of Classification Search .................. 363/17, 363/21.02, 21.03, 21.12–21.15, 31.49, 93, 363/140
See application file for complete search history.

(56) References Cited

U.S. PATENT DOCUMENTS

| | | | |
|---|---|---|---|
| 7,286,373 B1 * | 10/2007 | Liu et al. | .......................... 363/16 |
| 7,315,460 B2 | 1/2008 | Kyono | |
| 7,339,799 B2 | 3/2008 | Osaka et al. | |
| 7,375,987 B2 | 5/2008 | Kyono | |
| 7,551,459 B1 * | 6/2009 | Wittenbreder, Jr. | ........ 363/21.06 |
| 7,629,781 B2 | 12/2009 | Kyono | |
| 2009/0256423 A1 | 10/2009 | Kyono | |

FOREIGN PATENT DOCUMENTS

| | | |
|---|---|---|
| JP | 9 56157 | 2/1997 |
| JP | 11 187661 | 7/1999 |
| JP | 2002 136135 | 5/2002 |
| JP | 2003 88118 | 3/2003 |
| JP | 2006 197755 | 7/2006 |

OTHER PUBLICATIONS

U.S. Appl. No. 12/442,824, filed Mar. 25, 2009, Kyono.

(Continued)

*Primary Examiner* — Matthew Nguyen
*Assistant Examiner* — Nusrat Quddus
(74) *Attorney, Agent, or Firm* — Oblon, Spivak, McClelland, Maier & Neustadt, L.L.P.

(57) ABSTRACT

A multiple-output switching power supply unit includes: a voltage generating circuit Q1, Q2, T1a, 10a configured to generate a pulse voltage by intermittently interrupting a direct current power supply 1; a series resonance circuit including a current resonance capacitor Cri2, a primary winding P2 of a transformer T2, and a switching element Q3, the pulse voltage generated in the voltage generating circuit being applied to the series resonance circuit; a rectifying/smoothing circuit D2, C2 configured to rectify and smooth a voltage which is generated in a secondary winding S2 of the transformer, and thus to output a direct current output voltage; and a control circuit 11 configured to turn on and off the switching element based on the direct current output voltage.

6 Claims, 15 Drawing Sheets

OTHER PUBLICATIONS

U.S. Appl. No. 12/528,461, filed Aug. 25, 2009, Kyono.
U.S. Appl. No. 12/990,390, filed Oct. 29, 2010, Kyono.
U.S. Appl. No. 12/667,973, filed Jan. 6, 2010, Kyono.
U.S. Appl. No. 13/494,342, filed Jun. 12, 2012, Kyono.

* cited by examiner

MULTIPLE-OUTPUT SWITCHING POWER SUPPLY UNIT

TECHNICAL FIELD

The present invention relates to a multiple-output switching power supply unit including multiple outputs.

BACKGROUND ART

FIG. 1 is a circuit diagram showing a configuration of a conventional resonance-type multiple-output switching power supply unit. In the primary side of a transformer T1 included in this multiple-output switching power supply unit, a full-wave rectifying circuit 2 rectifies an alternating current voltage from a commercial power supply 1. A smoothing capacitor C3 is connected between the output terminals of the full-wave rectifying circuit 2, and thus smoothes an output from the full-wave rectifying circuit 2. A first switching element Q1 and a second switching element Q2 are connected together in series between the two terminals of the smoothing capacitor C3. Thus, as a direct current input voltage Vin, a voltage between the two terminals of the smoothing capacitor C3 is applied to the first and second switching elements Q1, Q2. A control circuit 10 controls the on and off of each of the first switching element Q1 and the second switching element Q2. A voltage resonance capacitor Crv is connected to the second switching element Q2 in parallel.

A series resonance circuit is connected to the two terminals of the voltage resonance capacitor Crv, and includes the primary winding P1 (its number of turns is denoted by reference sign N1) of the transformer T1, a reactor Lr1 and a current resonance capacitor Cri which are connected one after another in series. Note that the reactor Lr1 is made of a leakage inductance between the primary and secondary sides of the transformer T1, for instance.

In addition, the secondary side of the transformer T1 includes: a first rectifying/smoothing circuit connected to a first secondary winding S1 (its number of turns is denoted by reference sign N2) whose coil is wound in order to generate a voltage having a phase which is reverse to that of a voltage of the primary winding P1 of the transformer T1; and a second rectifying/smoothing circuit connected to a second secondary winding S2 (its number of turns is denoted by reference sign N3) whose coil is wound in order to generate a voltage having a phase which is reverse to that of a voltage of the primary winding P1 of the transformer T1.

The first rectifying/smoothing circuit includes a diode D1 and a smoothing capacitor C1. Thus, the first rectifying/smoothing circuit rectifies and smoothes a voltage which is induced by the first secondary winding S1 of the transformer T1, and outputs the resultant voltage, as a first output voltage Vo1, from a first output terminal. The second rectifying/smoothing circuit includes a diode D2 and a smoothing capacitor C2. Thus, the second rectifying/smoothing circuit rectifies and smoothes a voltage which is induced by the second secondary winding S2 of the transformer T1, and outputs the resultant voltage, as a second output voltage Vo2, from a second output terminal.

This multiple-output switching power supply unit further includes a feedback circuit 5 configured to feed back to the primary side a signal depending on the first output voltage Vo1. The input side of the feedback circuit 5 is connected to the first output terminal. This feedback circuit 5 compares a voltage between the two terminals of the smoothing capacitor C1 with a predetermined reference voltage, and thus feeds back an error voltage, as a voltage error signal, to a control circuit 10 of the primary side.

The control circuit 10 performs a PWM control by alternately turning on and off the first switching element Q1 and the second switching element Q2 on the basis of the voltage error signal fed back from the feedback circuit 5, and thereby controls the first output voltage Vo1 so that the first control output voltage Vo1 can be constant. In this case, as a control signal, a voltage for causing the first switching element Q1 and the second switching element Q2 to intermittently stop functioning for a dead time of approximately several hundreds of nanoseconds is applied to the gates respectively of the first switching element Q1 and the second switching element Q2. This makes the first switching element Q1 and the second switching element Q2 alternately turned on and off without making the on period of the first switching element Q1 and the on period of the second switching element Q2 happen at the same time.

Next, referring to a waveform diagram shown in FIG. 2, descriptions will be provided for how the conventional multiple-output switching power supply unit thus configured operates.

In FIG. 2, reference sign Vds(Q2) denotes a voltage between the drain and source of the second switching element Q2; Id(Q1), a current flowing through the drain of the first switching element Q1; Id(Q2), a current flowing through the drain of the second switching element Q2; I(Cri), a current flowing through the current resonance capacitor Cri; V(Cri), a voltage between the two terminals of the current resonance capacitor Cri; If(D1), a current flowing through the diode D1; and If(D2), a current flowing through the diode D2.

The first output voltage Vo1 is controlled, when the PWM control is performed on the first switching element Q1 by the control circuit 10 which receives the voltage error signal fed back to the primary side from the first rectifying/smoothing circuit through the feedback circuit 5. In this case, as described above, depending on the control signal from the control circuit 10, the first switching element Q1 and the second switching element Q2 alternately turn on and off while repeatedly stopping functioning for the dead time of approximately several hundreds of nanoseconds.

First of all, during the on period (for instance, between time t11 and time t12) of the first switching element Q1, energy is stored in the current resonance capacitor Cri through the magnetic inductance of the primary winding P1 of the transformer T1 and the reactor Lr1 (leakage inductance between the primary and secondary windings of the transformer T1).

Subsequently, during the on period (for instance, between time t12 and time t14) of the second switching element Q2, based on the energy stored in the current resonance capacitor Cri, a resonant current generated by the reactor Lr1 and the current resonance capacitor Cri flows, and the energy is thus transferred to the secondary side. In addition, the magnetic energy of the magnetic inductance of the primary winding P1 is reset.

More specifically, during the on period of the second switching element Q2, a voltage obtained by dividing the voltage V(Cri) between the two terminals of the current resonance capacitor Cri by the magnetic inductance of the primary winding P1 and the reactor Lr1 is applied to the primary winding P1. Once the voltage applied to the primary winding P1 becomes equal to $(Vo1+Vf) \times N1/N2$, the voltage is clamped. Thereby, the resonant current generated by the current resonance capacitor Cri and the reactor Lr1 flows, and the energy is thus transferred to the secondary side. This makes the current If(D1) flow through the diode D1. While the voltage of the primary winding P1 is less than (Vo1+Vf)×N1/N2, no energy is transferred to the secondary side of the transformer T1. Accordingly, the resonance operation in the primary side only is performed by the magnetic inductance of the primary winding P1 of the transformer T1, the reactor Lri, and the current resonance capacitor Cri.

In general, the on period of the second switching element Q2 is set at a time length which is determined by the on period of the first switching element Q1 with the frequency being fixed, or set at an arbitrary constant time length. When the on period of the first switching element Q1 is changed, the ratio of the duty of the first switching element Q1 and the second switching element Q2 is changed. Thereby, the voltage of the current resonance capacitor Cri is changed. For this reason, it is possible to control the amount of energy which is transferred to the secondary side.

Moreover, the first secondary winding S1 and the second secondary winding S2 are coupled together with the same polarity being shared between the two windings. During the on period of the second switching element Q2, while energy obtained from the first secondary winding S1 is being outputted as the first output voltage Vo1, energy obtained from the second secondary winding S2 is outputted as the second output voltage Vo2. This second output voltage Vo2 is almost equal to Vo1×N3/N2.

In reality, however, the voltage generated in the first secondary winding S1 is higher than the first output voltage Vo1 by a forward step-down voltage Vf of the diode D1, and the voltage generated in the second secondary winding S2 is higher than the second output voltage Vo2 by a forward step-down voltage Vf of the diode D2. For this reason, change in Vf due to the load fluctuation of each output deteriorates the cross regulation. On the other hand, in the case of a power supply unit whose specification makes its output voltages changeable, once one output voltage changes, the other output voltage also changes in proportion to it. This makes it impossible to output the multiple outputs directly from the windings.

FIG. 3 is a circuit diagram showing a configuration of another conventional multiple-output switching power supply unit. This multiple-output switching power supply unit includes a regulator 12 such as a dropper or a step-down chopper instead of the second rectifying/smoothing circuit shown in FIG. 1. By use of this regulator 12, this multiple-output switching power supply unit generates the second output voltage Vo2 from the first output voltage Vo1. Thereby, this multiple-output switching power supply unit stabilizes its outputs. This multiple-output switching power supply unit is capable of solving the problem of the cross regulation between the two outputs.

In a case where an output current corresponding to the second output voltage Vo2 is small, this multiple-output switching power supply unit allows its circuit to be constructed economically by use of the dropper. However, in a case where the output current corresponding to the second output voltage Vo2 is large, this multiple-output switching power supply unit requires its circuit to be constructed by use of the step-down chopper and the like. Additional installation of parts including a switching element, a choke coil and a control IC for this construction pushes up the costs, and increases the packaging area. Besides, because the switching elements turn on and off paths through which large currents flow, significant switching loss occurs, and noise inevitably occurs as well.

In the case of a switching power supply unit described in Patent Document 1, a rectifying diode, a switching element and a smoothing capacitor are connected in series to a second secondary winding of a transformer included in a current resonance-type DC-DC converter; based on a voltage of the smoothing capacitor, the switching element turns on and off; and a direct current output is thus outputted. In addition, a leakage inductance of the transformer, the rectifying diode, the switching element and the smoothing capacitor operate as a chopper circuit, and are thus capable of stabilizing the direct current output.

Patent Document 1: Japanese Patent Application Publication No. 2006-197755.

DISCLOSURE OF THE INVENTION

Problem to be Solved by the Invention

As described above, the conventional multiple-output switching power supply units have: the problem that the load fluctuation in each output deteriorates the cross regulation; and the problem that the multiple outputs cannot be outputted directly from the windings in the case of the power supply unit whose specification makes its output voltages changeable. Furthermore, the conventional multiple-output switching power supply unit configured so that the regulator is placed in the secondary side to solve the problem of the cross regulation has: the problem that the regulator loss is large; the problem that the additional installation of the parts pushes up the costs, and increases the packaging area; and the problem that the regulator causes the noise.

Moreover, the switching power supply unit described in Patent Document 1 operates as the step-down chopper. For this reason, this switching power supply unit only outputs a voltage which is lower than its input voltage, but is incapable of outputting a voltage which is higher than its input voltage.

An object of the present invention is to provide a multiple-output switching power supply unit which is capable of stabilizing multiple outputs even if the load fluctuation occurs.

Means for Solving the Problem

A first invention includes: a voltage generating circuit configured to generate a pulse voltage by intermittently interrupting a direct current power supply; a series resonance circuit including a current resonance capacitor, a primary winding of a transformer and a switching element, the pulse voltage generated by the voltage generating circuit being applied to the series resonance circuit; a rectifying/smoothing circuit configured to rectify and smooth a voltage which is generated in a secondary winding of the transformer, and to output a direct current output voltage; and a control circuit configured to turn on and off the switching element based on the direct current output voltage.

A second invention is the multiple-output switching power supply unit according to the first invention, in which the control circuit turns on the switching element while the pulse voltage is applied, the control circuit turns off the switching element in synchronism with a rise of the pulse voltage, and the control circuit controls a period of time for which the switching element is off, based on the direct current output voltage.

A third invention is the multiple-output switching power supply unit according to the first invention, in which the control circuit turns on the switching element while the pulse voltage is being applied, the control circuit turns off the switching element once a predetermined time passes while no pulse voltage is being applied, and the control circuit controls a period of time for which the switching element is off, based on the direct current output voltage.

A fourth invention is the multiple-output switching power supply unit according to the first invention, in which a recovery diode is connected in parallel to a series circuit which includes the current resonance capacitor and a primary winding of the transformer in the series resonance circuit.

A fifth invention is the multiple-output switching power supply unit according to the fourth invention, in which the control circuit turns on the switching element in synchronism with a fall of the pulse voltage, and the control circuit controls a period of time for which the switching element is on, based on the direct current output voltage.

A sixth invention is the multiple-output switching power supply unit according to the fourth invention, in which the control circuit turns on the switching element in synchronism with a rise of the pulse voltage, and the control circuit controls a period of time for which the switching element is on, based on the direct current output voltage.

A seventh invention is the multiple-output switching power supply unit according to the first invention, in which the voltage generating circuit comprises: a first switching element and a second switching element which are connected in series between two terminals of the direct current power supply, a first switching element and a second switching element being configured to generate the pulse voltage by turning on and off the first switching element and the second switching element; and a first series resonance circuit which includes a primary winding of a first transformer and a first current resonance capacitor, the first series resonance circuit being connected in parallel to any one of the first switching element and the second switching element, anyone of the pulse voltage generated by turning on and off the first switching element and the second switching element, and the pulse voltage generated in the first transformer is applied to the series resonance circuit, the multiple-output switching power supply unit further comprising: a first rectifying/smoothing circuit configured to rectify and smooth a pulse voltage generated in a secondary winding of the first transformer, and thus to output a first output voltage; and a first control circuit configured to turn on and off the first switching element and the second switching element alternately based on the first output voltage.

Effects of the Invention

According to the first invention, it is possible to economically construct a highly-efficient and low-noise multiple-output switching power supply unit capable of stabilizing a second output by only adding the current resonance capacitor, the transformer and the switching element to a conventional converter. In addition, the pulse voltage generated by intermittently interrupting the direct current voltage is applied to the series resonance circuit, and the control circuit turns on and off the switching element depending on a second output voltage. For this reason, the controlling of the on and off duty depending on a control signal makes it possible to control a voltage outputted from the transformer of the series resonance circuit by use of the control signal. Furthermore, the control circuit turns on and off the switching element based on the second output voltage. For this reason, it is possible to construct a resonance-type switching power supply unit having the simple control circuit.

According to the second invention, the control circuit turns off the switching element in synchronism with a rise of the inputted pulse voltage, and the control circuit turns on the switching element once a predetermined time passes while the pulse voltage is being applied. For this reason, by controlling the off period of the switching element, it is possible to control a magnetizing current of the transformer, that is, a charging current of the current resonance capacitor. By this, an output voltage obtained by rectifying and smoothing the pulse voltage generated in the secondary winding of the transformer is controlled. In addition, while no pulse voltage is being applied, the magnetic energy of the transformer is reset, and the transformer is subsequently reversely magnetized by a resonant current which occurs due to the discharge of electricity from the current resonance capacitor. However, the control circuit holds the switching element on during this period of time as well. For this reason, the loss is small. Furthermore, the control circuit controls the period of time for which the switching element is off, based on the direct current output voltage. For this reason, it is possible to stabilize the outputs even if load fluctuates.

According to the third invention, the control circuit turns off the switching element once a predetermined time passes while no inputted pulse voltage is being applied, and the control circuit turns on the switching element once a predetermined time passes while the pulse voltage is being applied. For this reason, by controlling the off period of the switching element after the pulse voltage is applied, it is possible to control the magnetizing current of the transformer, that is, the charging current of the current resonance capacitor. By this, the output voltage obtained by rectifying and smoothing the pulse voltage generated in the secondary winding of the transformer is controlled. In addition, while no pulse voltage is being applied, the magnetic energy of the transformer is reset, and the transformer is subsequently reversely magnetized by the resonant current which occurs due to the discharge of electricity from the current resonance capacitor. However, because this resonant current flows through a body diode in the switching element, the switching element is held off during this period of time. No voltage is applied to the switching element. For this reason, no loss occurs. Furthermore, the control circuit controls the period of time for which the switching element is off, based on the direct current output voltage. For this reason, it is possible to stabilize the outputs even if load fluctuates.

According to the fourth invention, the recovery diode is connected in parallel to the series circuit including the current resonance capacitor and the primary winding of the transformer of the series resonance circuit. For this reason, when the switching element is turned off, it is possible to clamp a voltage which is applied to the switching element due to the magnetic energy of the transformer in a way that the voltage does not become equal to or higher than the pulse voltage. This makes it possible to use the switching element which has a lower breakdown voltage.

According to the fifth invention, the control circuit turns on the switching element in synchronism with a fall of the pulse voltage, and controls a period of time for which the switching element is on based on the direct current output voltage. For this reason, it is possible to control the charging current of the current resonance capacitor. By this, the output voltage obtained by rectifying and smoothing the pulse voltage generated in the secondary winding of the transformer is controlled.

According to the 6th invention, the control circuit turns on the switching element in synchronism with a rise of the pulse voltage, and controls the period of time for which the switching element is on based on the direct current voltage. For this reason, it is possible to control the charging current of the current resonance capacitor. By this, the output voltage obtained by rectifying and smoothing the pulse voltage generated in the secondary winding of the transformer is controlled.

According to the 7th invention, if the resonance-type switching power supply unit is used with a DC-DC converter, it is possible to set up the entire DC-DC converter as a resonance-type DC-DC converter, and accordingly to construct a low-noise and highly-efficient multiple-output switching power supply.

Figure 1:
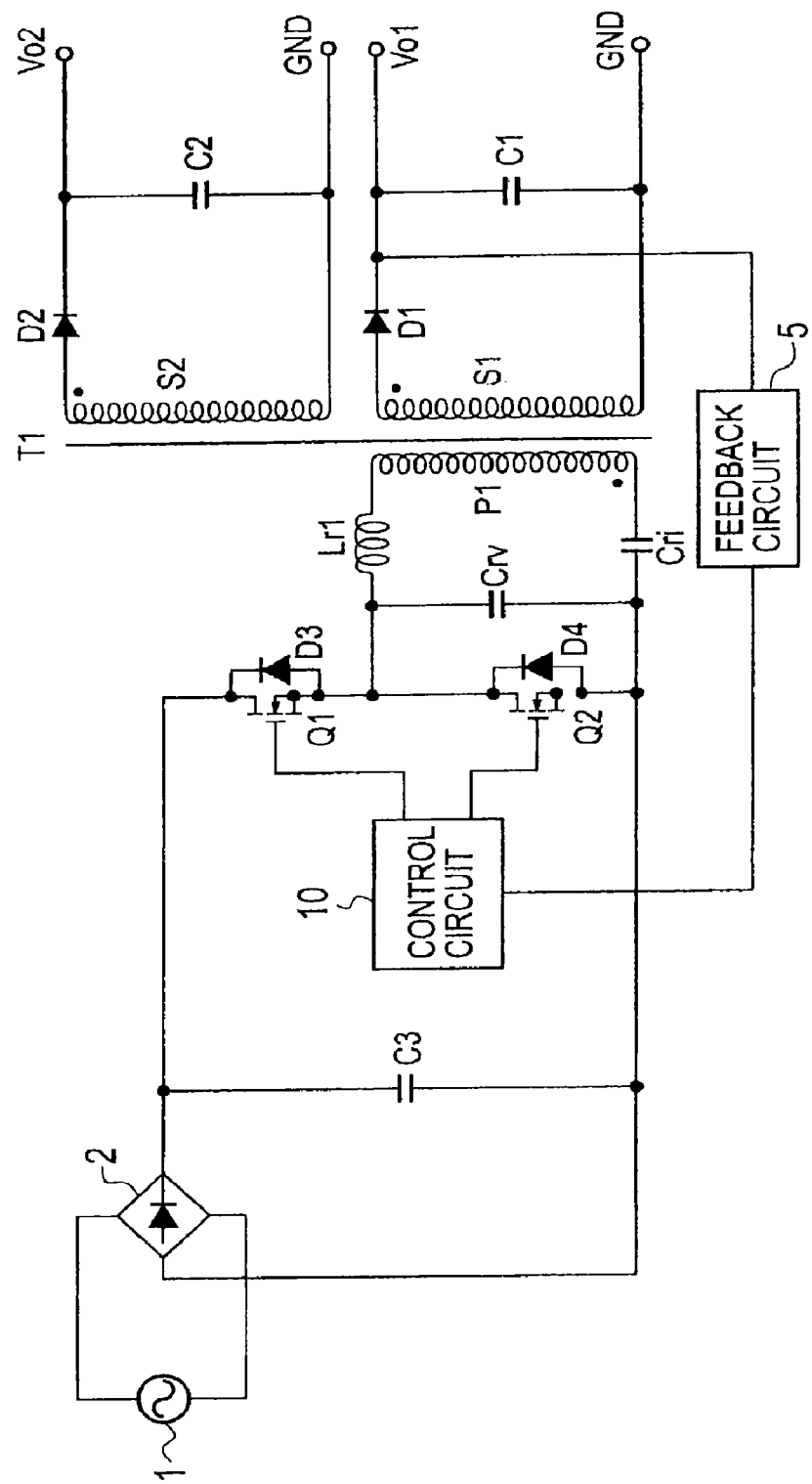
FIG. 1 is a circuit diagram showing a configuration of a conventional multiple-output switching power supply unit.
Figure 2:
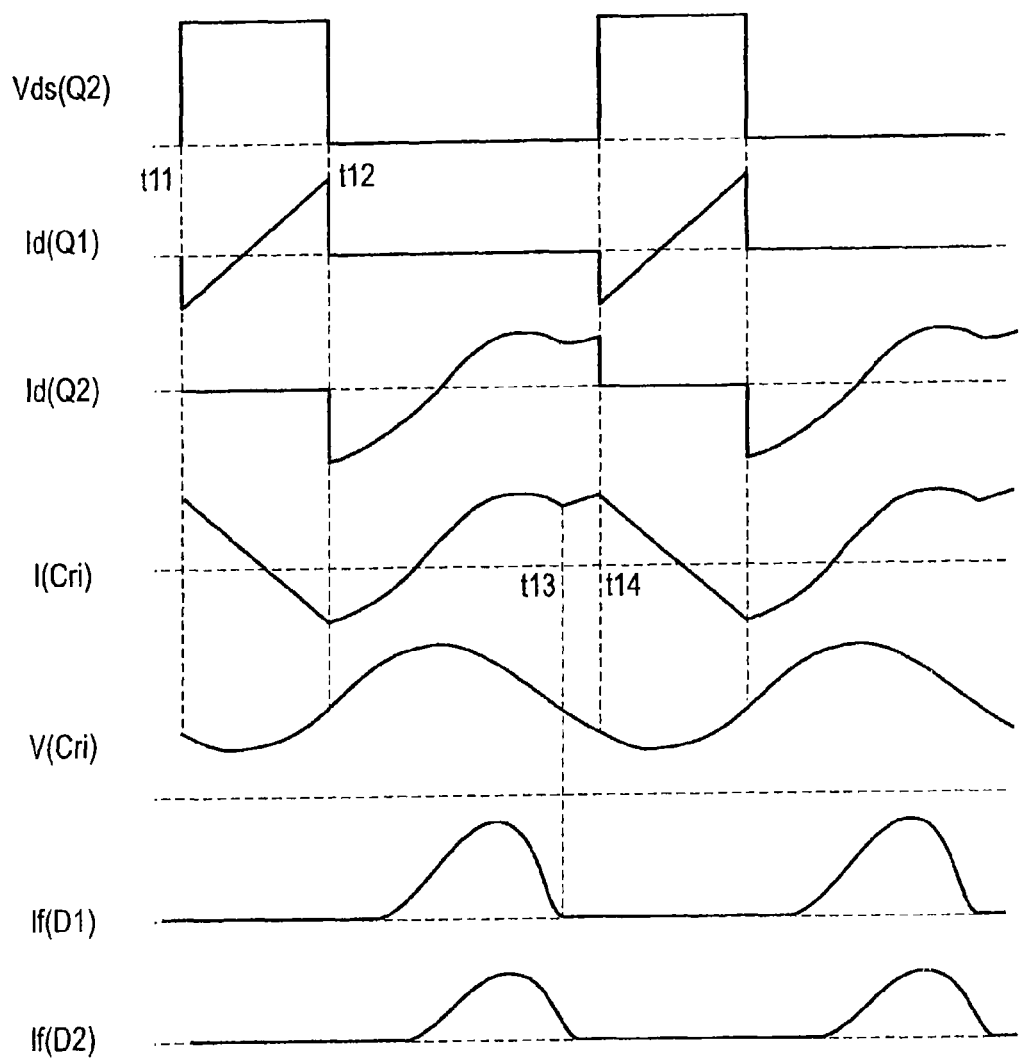
FIG. 2 is a waveform diagram showing how the conventional multiple-output switching power supply unit operates.
Figure 3:
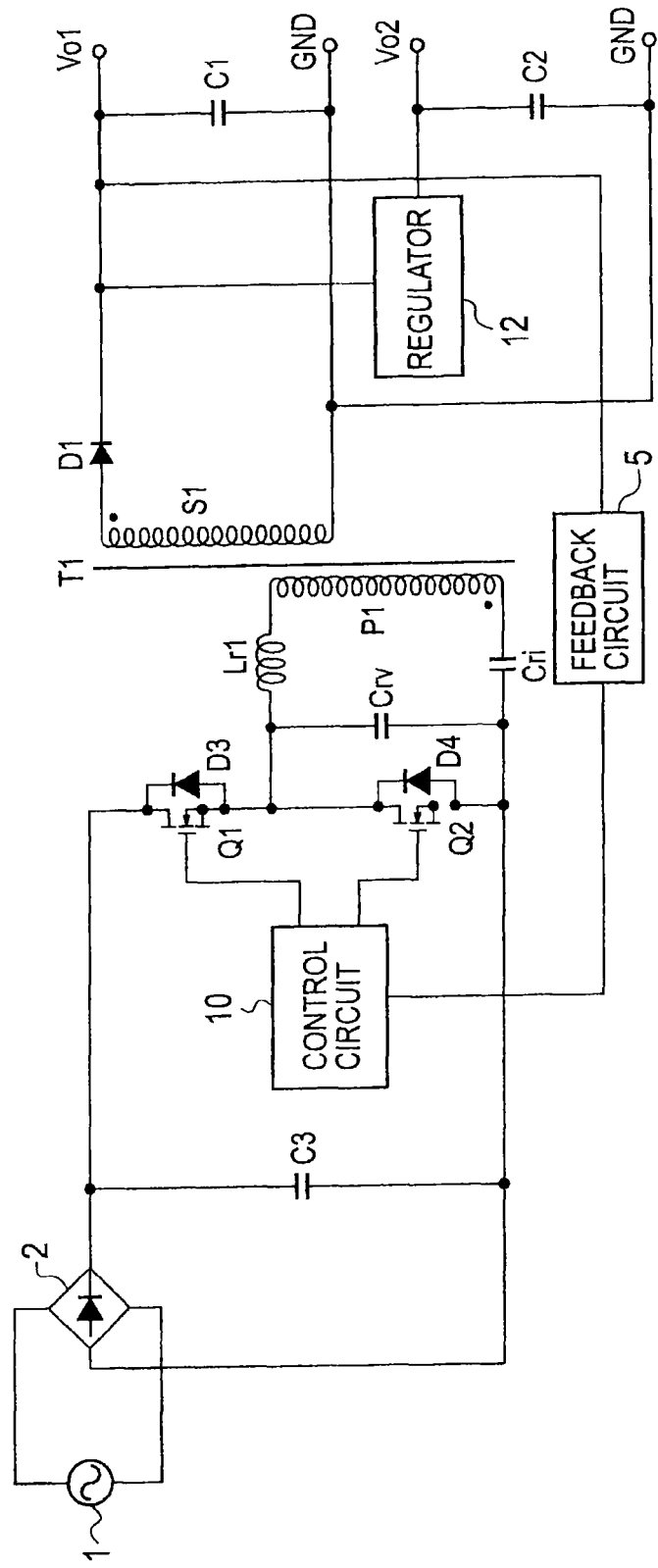
FIG. 3 is a circuit diagram showing a configuration of another conventional multiple-output switching power supply unit.

EXPLANATION OF REFERENCE SIGNS 1 commercial power supply
2 full-wave rectifying circuit
5 feedback circuit
10 control circuit
11 second control circuit
12 regulator
110 RSF/F
Q1 first switching element
Q2 second switching element
Q3 third switching element
C1, C2, C3, C11 smoothing capacitor
Cri, Cri2 current resonance capacitor
Crv voltage resonance capacitor
D1, D2, D3, D4, D11 diode
Lr1 first resonance reactor
Lr2 second resonance reactor
T1, T2, T1a, T1b transformer
R11, R12, R13 resistor
P1, P2 primary winding
S1, S2 secondary winding
CMP comparator
EAMP error amplifier

BEST MODES FOR CARRYING OUT THE INVENTION

Referring to the drawings, detailed descriptions will be hereinbelow provided for examples of a multiple-output switching power supply unit according to the present invention.

EXAMPLE 1

Figure 4:
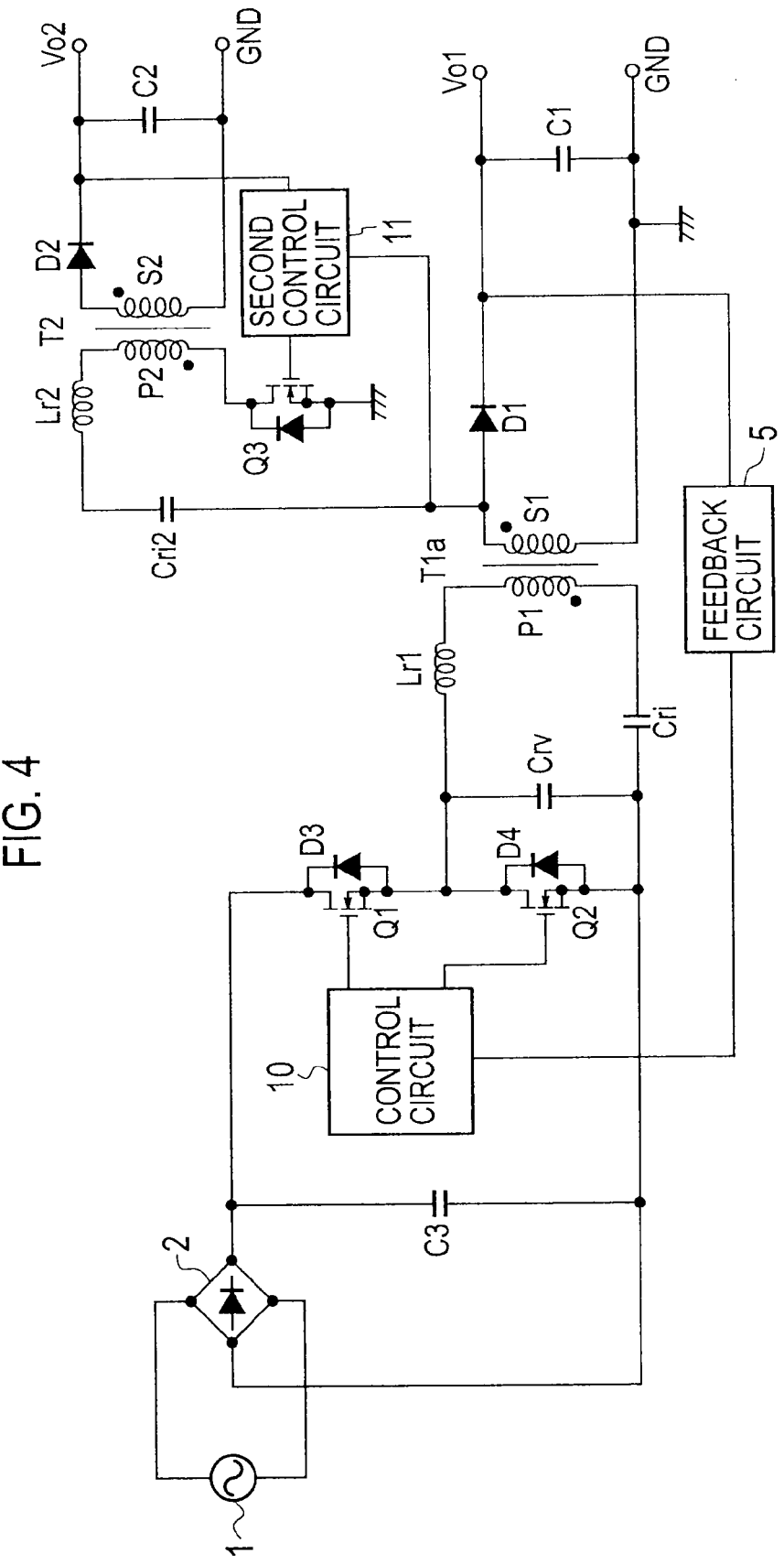
FIG. 4 is a circuit diagram showing a configuration of a multiple-output switching power supply unit according to Example 1 of the present invention.

FIG. 4 is a circuit diagram showing a configuration of a multiple-output switching power supply unit according to Example 1 of the present invention. This multiple-output switching power supply unit includes a transformer T1a (a first transformer) and a transformer T2 (a second transformer).

In the primary side of the transformer T1a, a full-wave rectifying circuit 2 rectifies an alternating current voltage from a commercial power supply 1. A smoothing capacitor C3 is connected between the output terminals of the full-wave rectifying circuit 2, and thus smoothes an output from the full-wave rectifying circuit 2. A first switching element Q1 and a second switching element Q2 are connected together in series between the two terminals of the smoothing capacitor C3. Thus, as a direct current input voltage Vin, a voltage between the two terminals of the smoothing capacitor C3 is applied to the first and second switching elements Q1, Q2. The first switching element Q1 and the second switching element Q2 are each made of a MOSFET, for instance. A control circuit 10a controls the on and off of each of the first switching element Q1 and the second switching element Q2. A voltage resonance capacitor Crv is connected to the second switching element Q2 in parallel.

A first series resonance circuit is connected to the two terminals of the voltage resonance capacitor Crv, and includes a primary winding P1 (its number of turns is denoted by reference sign N1) of the transformer T1a, a first resonance reactor Lr1 and a first current resonance capacitor Cri which are connected one after another in series. Note that the first resonance reactor Lr1 is made of a leakage inductance between the primary and secondary sides of the transformer T1a, for instance.

The first switching element Q1, the second switching element Q2, the control circuit 10, and the transformer T1a constitute a voltage generating circuit configured to generate a pulse voltage by intermittently interrupting the voltage between the two terminals of the smoothing capacitor C3.

The secondary side of the transformer T1a includes a first rectifying/smoothing circuit connected to a secondary winding S1 (its number of turns is denoted by reference sign N2)

whose coil is wound in order to generate a voltage having a phase which is reverse to that of a voltage of the primary winding P1 of the transformer T1a.

The first rectifying/smoothing circuit includes a diode D1 and a smoothing capacitor C1. An anode of the diode D1 is connected to a first end of the secondary winding S1, and a cathode of the diode D1 is connected to a first output terminal. The smoothing capacitor C1 is connected between the cathode of the diode D1 (the first output terminal) and a second end of the secondary winding S1 (a GND terminal). The first rectifying/smoothing circuit rectifies and smoothes a voltage which is induced in the secondary winding S1 of the transformer T1a, and outputs the resultant voltage, as a first output voltage Vo1, from the first output terminal.

In addition, a second series resonance circuit is provided between the two terminals of the secondary winding S1 of the transformer T1a. The second series resonance circuit includes: a second current resonance capacitor Cri2, a first end of which is connected to the first end of the secondary winding S1 of the transformer T1a; a primary winding P2 of the transformer T2, a first end of which is connected to a second end of the second current resonance capacitor Cri2, and a second end of which is connected to a drain terminal of a third switching element Q3 made of, for instance, a MOSFET; and the third switching element Q3. Note that a second resonance reactor Lr2 is made of a leakage inductance between the primary and secondary sides of the transformer T2, for instance. A source terminal of the switching element Q3 is connected to the second end of the secondary winding S1 of the transformer T1a, and a gate terminal of the switching element Q3 is connected to a second control circuit 11. The secondary side of the transformer T2 includes a second rectifying/smoothing circuit connected to the secondary winding S2 (its number of turns is denoted by reference sign N4) whose coil is wound in order to generate a voltage having a phase which is reverse to that of a voltage of the primary winding P2 (its number of turns is denoted by reference sign N3) of the transformer T2.

The second rectifying/smoothing circuit includes a diode D2 and a smoothing capacitor C2. An anode of the diode D2 is connected to the secondary winding S2 of the transformer T2, and a cathode of the diode D2 is connected to a second output terminal. The smoothing capacitor C2 is connected between the cathode of the diode D2 (the second output terminal) and a second terminal of the secondary winding S2 (a GND terminal) of the secondary winding S2. Thus, the smoothing capacitor C2 outputs a voltage between the two terminals of the smoothing capacitor C2 as an output voltage Vo2. The second output voltage Vo2 is fed back to the second control circuit 11.

Moreover, this multiple-output switching power supply unit further includes a feedback circuit 5 configured to feed back the first output voltage Vo1 to the primary side. The feedback circuit 5 compares the first output voltage Vo1, which is outputted to the first output terminal, with a predetermined reference voltage, and thus outputs the error voltage, as a first voltage error signal, to the control circuit 10 in the primary side.

The control circuit 10 performs a PWM control by turning on and off the first switching element Q1 and the second switching element Q2 alternately based on the first voltage error signal from the feedback circuit 5, and thereby controls the first output voltage Vo1 so that the first control output voltage Vo1 can be kept constant. In this case, as a control signal, a voltage for causing the first switching element Q1 and the second switching element Q2 to intermittently stop functioning for a dead time of approximately several hundreds of nanoseconds is applied to the gates respectively of the first switching element Q1 and the second switching element Q2. This makes the first switching element Q1 and the second switching element Q2 alternately turned on and off without making the on period of the first switching element Q1 and the on period of the second switching element Q2 happen at the same time.

Figure 6:
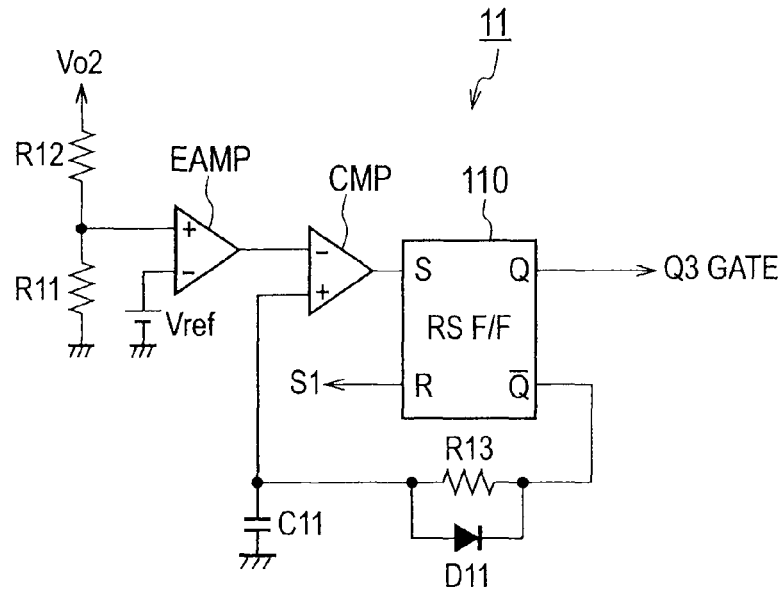
FIG. 6 is a circuit diagram showing an example of a second control circuit included in the multiple-output switching power supply unit according to Example 1 of the present invention.
Figure 7:
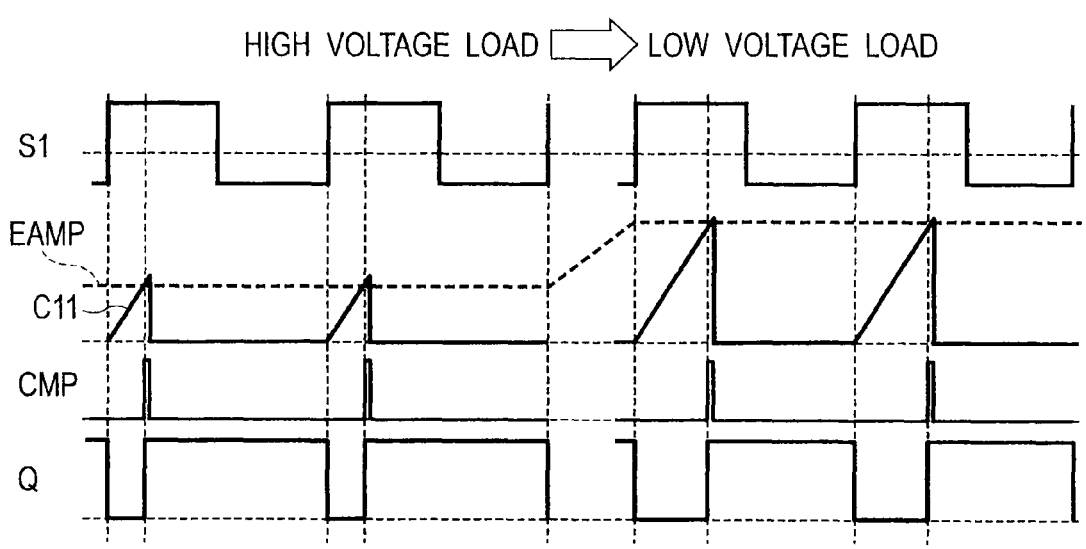
FIG. 7 is a diagram of waveforms which occur when an output Vo2 from the multiple-output switching power supply unit according to Example 1 of the present invention is high voltage load, and waveforms which occur when the output Vo2 therefrom is low voltage load.

Next, descriptions will be provided for an example of the second control circuit 11 according to Example 1 of the present invention, referring to a circuit diagram shown in FIG. 6 and an operational waveform diagram shown in FIG. 7.

In the second control circuit 11 shown in FIG. 6, a + input terminal of an error amplifier EAMP is connected to a connection point between a resistor R11 and a resistor R12, whereas a — input terminal of the error amplifier EAMP is connected to a reference voltage Vref. The error amplifier EAMP is configured to compare the reference voltage Vref with a voltage which is obtained by dividing the second output voltage Vo2, which is applied between the two ends of the series connection of the resistor R11 and the resistor R12, by the resistor R11 and the resistor R12. Thus, the error amplifier EAMP outputs a resultant error voltage signal to a—input terminal of a comparator CMP.

A + input terminal of the comparator CMP is connected to a capacitor C11 and a connection point between a first end of a resistor R13 and an anode of a diode D11. A second end of the resistor R13 and a cathode of the diode D11 are connected to a reverse output terminal of a flip-flop 110 (hereinafter referred to as "RSF/F110"). An output of the comparator CMP is connected to an S (set) input terminal of the RSF/F110, whereas a R (reset) input terminal of the RSF/F110 is connected to the first end of the secondary winding S1 of the transformer T1a. A normal output terminal Q of the RSF/F110 is connected to the gate terminal of the third switching element Q3.

Next, descriptions will be provided for how the second control circuit 11 shown in FIG. 6 operates, referring to an operational waveform diagram in FIG. 7 showing waveforms which occur when the second output voltage Vo2 is high voltage load, and waveforms which occur when the second output voltage Vo2 is low voltage load. First of all, once the switching element Q2 is turned on, the voltage induced in the secondary winding S1 of the transformer T1a is inputted into the R input terminal of the RSF/F110. Thus, in response to a rising edge of this voltage, a normal output Q of the RSF/F110 turns to L level, whereas a reverse output Q of the RSF/F110 turns to H level.

Thereby, the capacitor C11 is charged through the resistor R13. Once a voltage of this capacitor C11 becomes equal to an output voltage from the error amplifier EAMP, an output of the comparator CMP turns to H level, and the normal output Q of the FSF/F110 turns to H level in response to this rising edge. Thus, a gate signal is outputted to the gate of the switching element Q3.

At this time, the reverse output Q of the RSF/F110 simultaneously turns to L level. For this reason, the voltage of the capacitor C11 is discharged through the diode D11. The gate signal applied to the switching element Q3 is held until the switching element Q2 is turned on at the next time. This period of time for which the gate signal applied to the switching element Q3 is held is an on period of the switching element Q3.

Once the second output Vo2 changes from high voltage load to low voltage load, the output voltage from the second output Vo2 rises. In response, the error voltage signal outputted from the error amplifier EAMP increases, and a voltage inputted into the—input terminal of the comparator CMP becomes larger. For this reason, it takes a longer time for the voltage of the capacitor C11 to become equal to the voltage of the—input terminal of the comparator CMP. Accordingly, a length of time for which the gate signal is being applied to the gate of the switching element Q3 becomes shorter. In this manner, depending on the voltage from the second output Vo2, a length of time for which the switching element Q3 is off is controlled.

Figure 5:
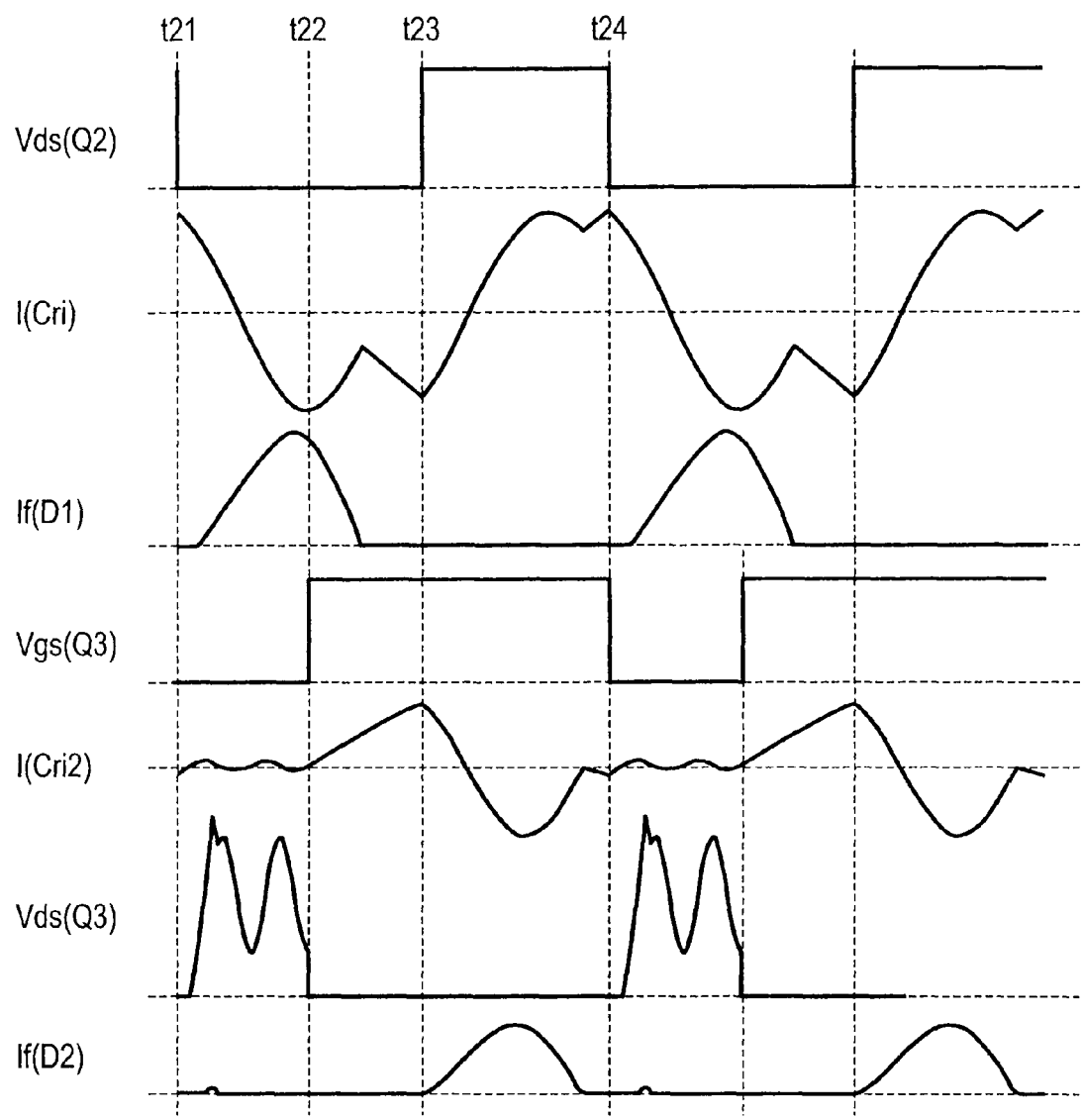
FIG. 5 is a waveform diagram showing how the multiple-output switching power supply unit according to Example 1 of the present invention operates.

Next, descriptions will be provided for how the multiple-output switching power supply unit thus configured according to Example 1 of the present invention operates, referring to a waveform diagram shown in FIG. 5. In FIG. 5, reference sign Vds(Q2) denotes a voltage between the drain and source of the second switching element Q2; I(Cri), a current which flows through the first current resonance capacitor Cri; If(D1), a current which flows through the diode D1; Vgs(Q3), a voltage between the gate and source of the third switching element Q3; I(Cri2), a current which flows through the second current resonance capacitor Cri2; Vds(Q3), a voltage between the drain and source of the third switching element Q3; and If(D2), a current which flows through the diode D2.

Like in the conventional multiple-output switching power supply unit, the first output voltage Vo1 is controlled by controlling the duty of the first switching element Q1 and the second switching element Q2. In other words, during the on period of the first switching element Q1, a voltage stored in the first current resonance capacitor Cri is controlled by changing the ratio of the duty of the first switching element Q1 and the second switching element Q2. Thereby, it is possible to control energy which is transmitted to the secondary side, because during the on period of the second switching element Q2, the energy is configured to be transmitted to the secondary side based on a resonant current which is generated by the first resonance reactor Lr1 and the first current resonance capacitor Cri due to the energy stored in the first current resonance capacitor Cri. Subsequently, a voltage generated in the secondary winding S1 is rectified and smoothed by the first rectifying/smoothing circuit including the diode D1 and the smoothing capacitor C1. Thus, the resultant voltage is outputted from the first output terminal, as the first output voltage Vo1.

The second output voltage Vo2 is controlled as follow. First of all, once the switching element Q2 turns on (at time t21), a voltage in a direction which causes the diode D1 to be electrified is generated in the secondary winding S1 of the transformer T1a. At this time, because the switching element Q3 is off, no electric current flows to the second series resonance circuit. Subsequently, after a period of time passes, the gate signal is applied to the gate of the switching element Q3, and the switching element Q3 is thus turned on (at time t22). In response, a magnetizing current flows through the second series resonance circuit due to the voltage induced in the secondary winding S1 of the transformer T1a. Thus, the second current resonance capacitor Cri2 is charged.

Subsequently, once the second switching element Q2 turns off and the first switching element Q1 turns on (at time t23), a voltage in the opposite direction is generated in the secondary winding S1 of the transformer T1a. In response, the voltage applied to the second series resonance circuit is reversed. Thus, a voltage in a direction which causes the diode D2 to be electrified is generated in the secondary winding S2 of the transformer T2, and energy is thereby transmitted to the second output Vo1. Concurrently, the magnetizing current of the transformer T2 is gradually reset due to the resonance operation, and a magnetizing current in the opposite direction thereafter starts to flow.

After that, the first switching element Q1 turns off, and the second switching element Q2 turns on. Synchronously, the third switching element Q3 turns off (at time t24). At this time, because the magnetizing current from the source to the drain of the third switching element Q3 flows through the primary winding P2 of the transformer T2, no switching loss occurs. In addition, the magnetizing current is reset through a parasitic body diode even after the switching element Q3 turns off.

As described above, when the switching element Q3 turns on, the electric current flows there starting at 0 (zero) A, and when the switching element Q3 turns off, the electric current flows there in the minus direction. This makes it possible to use the switching element Q3 whose switching loss is extremely small both when turning on and when turning off, and which is economical.

Furthermore, in a case where the load is changed, or in a case where the output voltages are made variable, the period of time (from time t21 through time t22) for which the switching element Q3 is off is controlled. For instance, in a case where the load is changed from the high voltage load to the low voltage load, the period of time (from time t21 through time t22) for which the switching element Q3 is off is extended. Thereby, a period of time for which the second series resonance circuit is energized becomes shorter, and an amount of energy stored in the second current resonance capacitor Cri2 thus decreases. Accordingly, it is possible to reduce the energy which is transmitted to the second output Vo2 while the first switching element Q1 is on.

EXAMPLE 2

Figure 8:
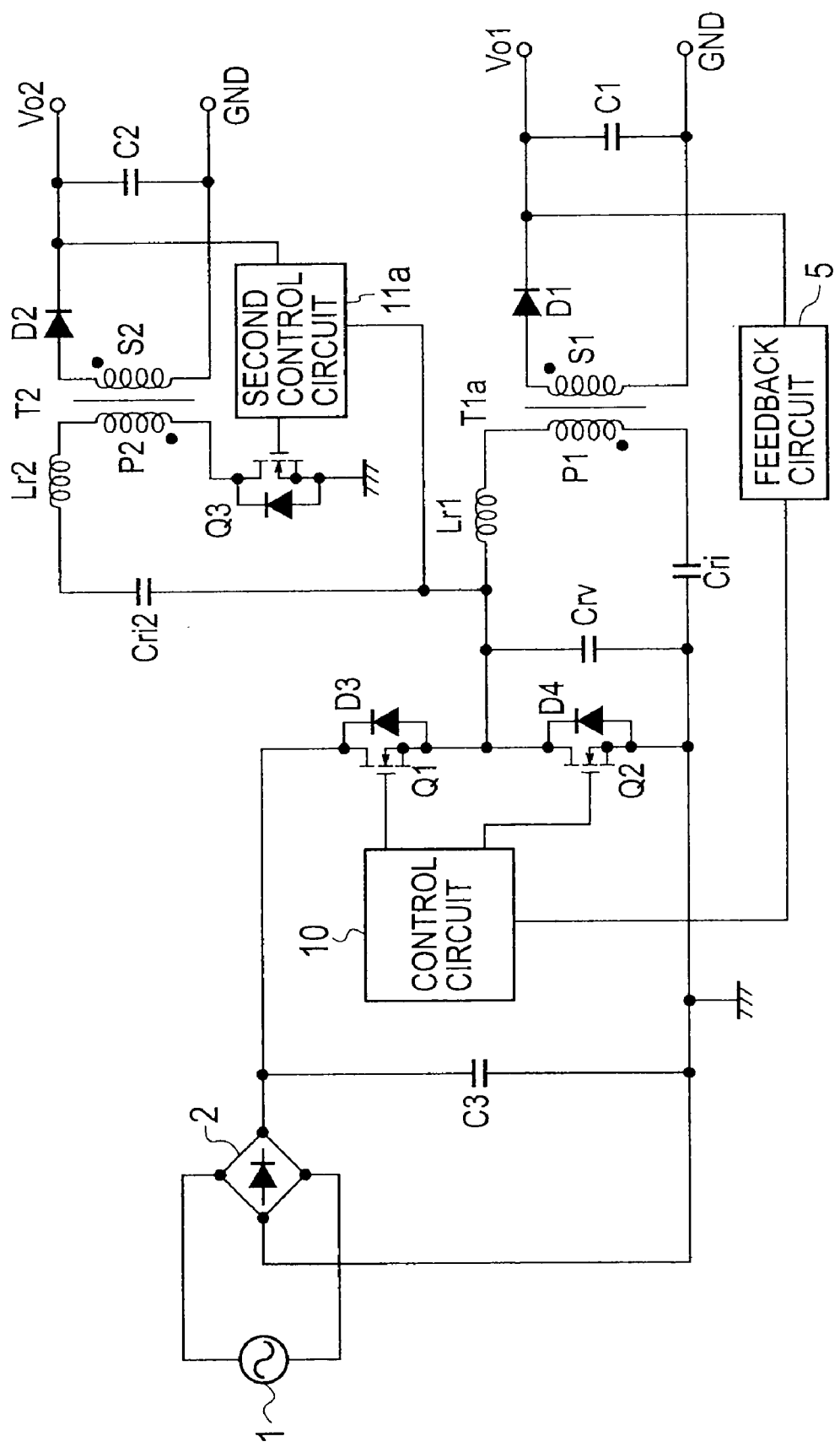
FIG. 8 is a circuit diagram showing a configuration of a multiple-output switching power supply unit according to Example 2 of the present invention.

FIG. 8 is a circuit diagram showing a configuration of an output switching power supply unit according to Example 2 of the present invention. The multiple-output switching power supply unit shown in FIG. 8 is different from the multiple-output switching power supply unit according to Example 1 shown in FIG. 4 in that the second series resonance circuit connected to the two terminals of the secondary winding S1 of the transformer T1a is connected between the drain and source of the second switching element Q2. In addition, the second control circuit 11a is connected to a connection point between the first switching element Q1 and the second switching element Q2, and thus detects a rising edge of the voltage between the drain and source of the second switching element Q2. Furthermore, although not illustrated, the second control circuit 11a detects an error signal of the second output voltage Vo2 through insulating means such as a photocoupler.

Figure 9:
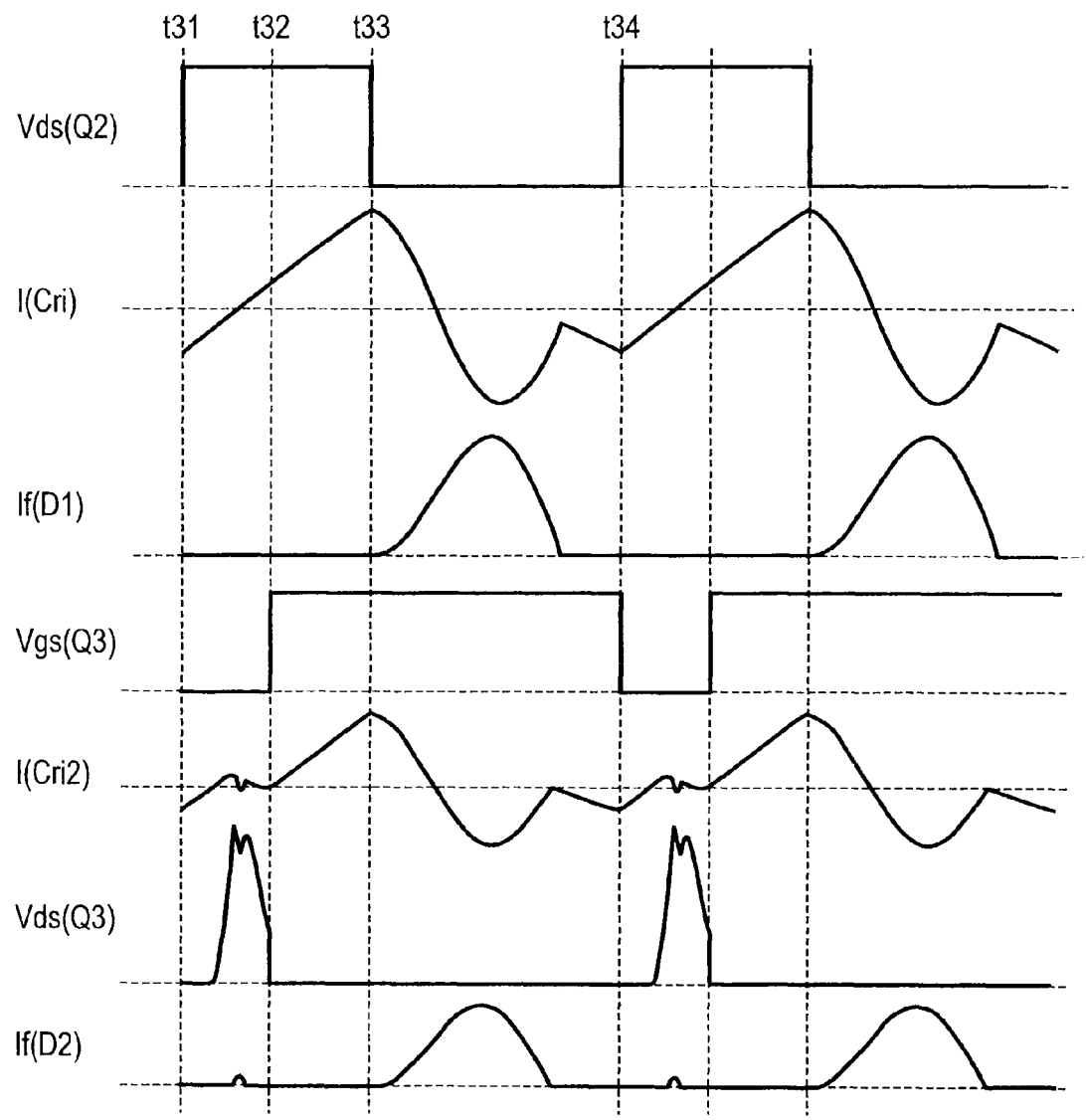
FIG. 9 is a waveform diagram showing how the multiple-output switching power supply unit according to Example 2 of the present invention operates.

Next, descriptions will be provided for how the multiple-output switching power supply unit thus configured according to Example 2 of the present invention operates, referring to a waveform diagram shown in FIG. 9.

Descriptions will be omitted for how the first output voltage Vo1 is controlled, because the first output voltage Vo1 is controlled in the same manner as is the first output voltage Vo1 according to Example 1.

The second output voltage Vo2 is controlled as follows. First of all, once the switching element Q1 turns on (at time t31), an electric potential at the connection point between the switching element Q1 and the second switching element Q2 turns to an input voltage. At this time, because the third switching element Q3 is off, no current flows through the second series resonance circuit. Subsequently, after a predetermined length of time passes, the gate signal is applied to the gate of the switching element Q3, and the switching element Q3 thus turns on (at time t32). In response, the input voltage is applied to the second series resonance circuit through the switching element Q1, and the magnetizing current thus flows through the second series resonance circuit. Accordingly, the second current resonance capacitor Cri2 is charged.

Thereafter, once the first switching element Q1 turns off and the second switching element Q2 turns on (at time t33), the potential of the connection point between the first switching element Q1 and the second switching element Q2 turns to the GND potential. In response, the voltage of the primary winding P2 of the transformer T2 is reversed. Thus, a voltage in a direction which causes the diode D2 to be electrified is generated in the secondary winding S2 of the transformer T2. Accordingly, energy is transmitted to the second output Vo2. Consequently, the magnetizing current of the transformer T2 is gradually reset due to the resonance operation, and a magnetizing current in the opposite direction thereafter starts to flow.

After that, the second switching element Q2 turns off, and the first switching element Q1 turns on. Synchronously, the third switching element Q3 turns off (at time t34). At this time, because the magnetizing current from the source to the drain of the switching element Q3 flows through the primary winding P2 of the transformer T2, no switching loss occurs. In addition, the magnetizing current is reset through the parasitic body diode even after the switch element Q3 turns off.

In the case of Example 2 shown in FIG. 9, as described above, while switching element Q3 is on, the electric current flows there starting at 0 (zero) A, and while the switching element is off, the electric current flows there in the minus direction, as in the case of Example 1 shown in FIG. 4. This makes it possible to use the switching element whose switching lose is extremely small both when the switching element turns on and when the switching element turns off, and which is economical. Furthermore, only an extremely small amount of noise is generated, because the switching loss of the switching element Q3 is extremely small, and additionally because the diode D2 turns on and off with no electric current.

Furthermore, in the case where the load is changed, or in the case where the output voltages are made variable, the period of time (from time t31 through time t32) for which the switching element Q3 is off is controlled, like in Example 1 shown in FIG. 4. For instance, in the case where the load is changed from the high voltage load to the low voltage load, the period of time (from time t31 through time t32) for which the switching element Q3 is off is extended. Thereby, the period of time for which the second series resonance circuit is energized becomes shorter, and the amount of energy stored in the second current resonance capacitor Cri2 thus decreases. Accordingly, it is possible to reduce the energy which is transmitted to the second output Vo2 while the second switching element Q2 is on.

EXAMPLE 3

Figure 10:
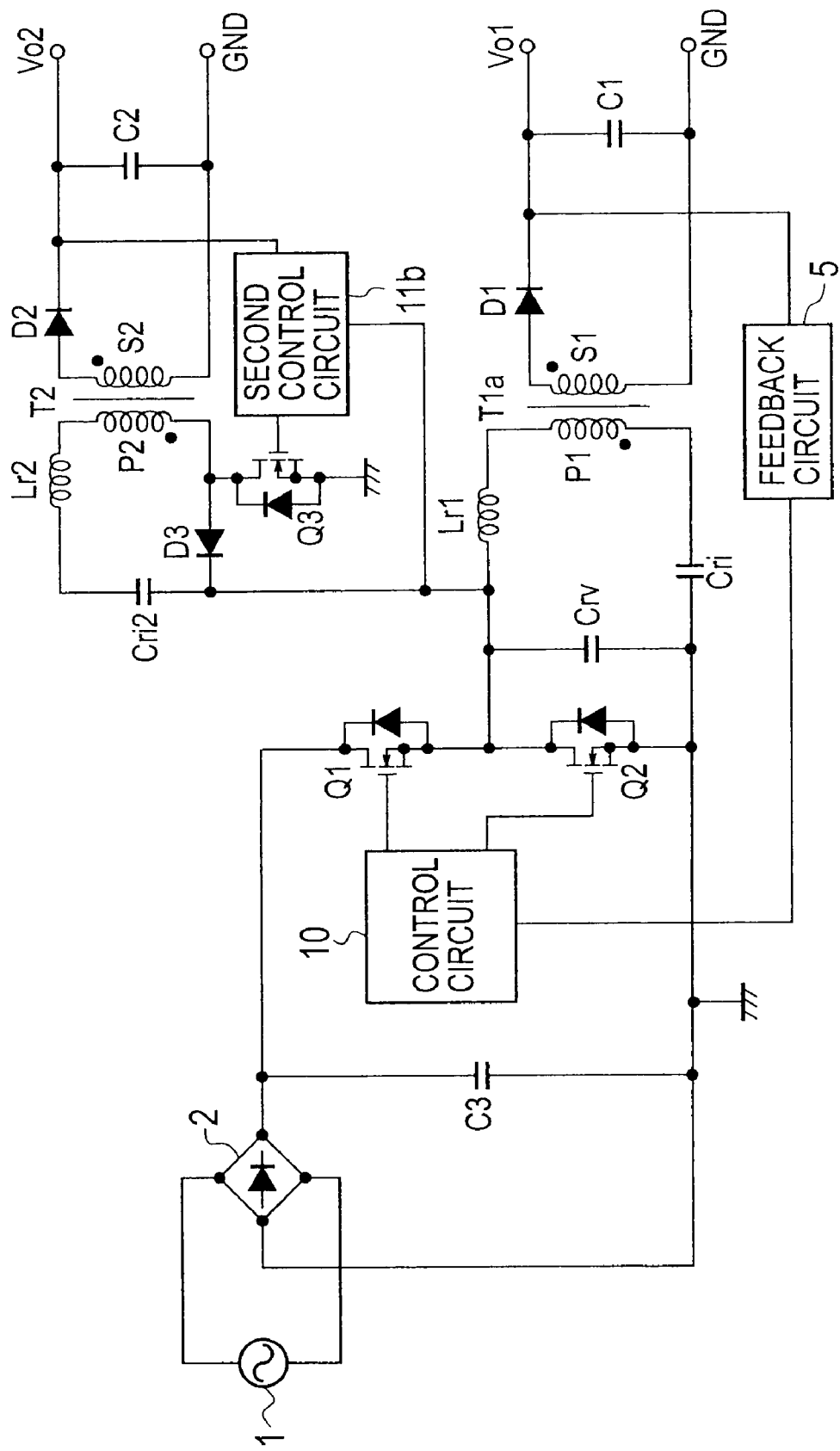
FIG. 10 is a circuit diagram showing a configuration of a multiple-output switching power supply unit according to Example 3 of the present invention.

FIG. 10 is a circuit diagram showing a configuration of multiple-output switching power supply unit according to Example 3 of the present invention. This multiple-output switching power supply unit is different from the multiple-output switching power supply unit according to Example 2 shown in FIG. 8 in that a diode D3 whose anode is connected to the drain of the third switching element Q3, and whose cathode is connected to the first end of the second current resonance capacitor Cri2, is added to the multiple-output switching power supply unit according to Example 2. The rest of the configuration of this multiple-output switching power supply unit is the same as the rest of the configuration of the multiple-output switching power supply unit according to Example 2.

Figure 11:
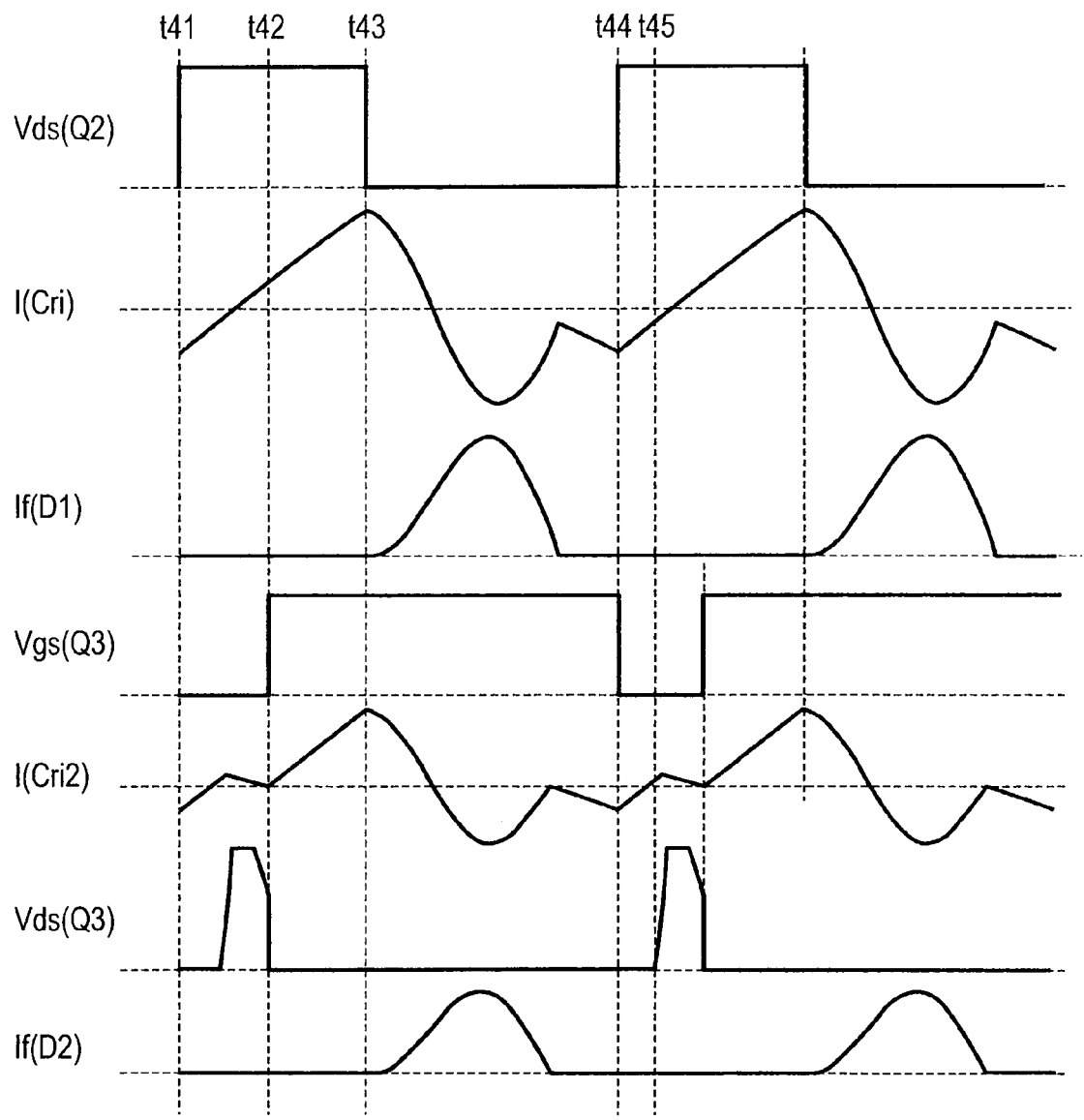
FIG. 11 is a waveform diagram showing how the multiple-output switching power supply unit according to Example 3 of the present invention operates.

Next, descriptions will be provided for how the multiple-output switching power supply unit thus configured according to Example 3 of the present invention operates, referring to a waveform diagram shown in FIG. 11.

Descriptions will be omitted for how the first output voltage Vo1 is controlled, because the first output voltage Vo1 is controlled in the same manner as is the first output voltage Vo1 according to Example 1.

The second output voltage Vo2 is controlled in the same manner as is the second output voltage Vo2 according to Example 2 shown in FIG. 8. In other words, an operation from time t41 through time t44 according to Example 3 shown in FIG. 11 is the same as the operation from time t31 through time t34 according to Example 2 shown in FIG. 8. For this reason, descriptions will be omitted for the operation from time t41 through time t44 according to Example 3.

Once the reset of the magnetizing current is completed (at time t45), no current is expected to flow through the second series resonance circuit, because the switching element Q3 is off. In reality, however, the magnetizing current, although in a minute amount, flows through the second series resonance circuit due to a capacitance between the drain and source of the switching element Q3 as well as influence of the recovery of the body diode.

In addition, due to this magnetizing current, the capacitance between the drain and source of the switching element Q3, the primary winding P2 of the transformer T2, and the second current resonance capacitor Cri2 carry out a resonance operation. As a result, the voltage between the drain and source of the switching element Q3 jumps up at maximum to a voltage twice as large as the input voltage.

In the case of the circuit according to Example 3 shown in FIG. 10, however, the diode D3 is connected to the drain of the switching element Q3, as well as to the connection point between the switching element Q1 and the switching element Q2. For this reason, once the voltage between the drain and source of the switching element Q3 becomes larger than the input voltage, the magnetizing current which flows through the primary winding P2 of the transformer T2 flows through the diode D3. This prevents the voltage between the drain and source of the switching element Q3 from becoming larger than the input voltage. This makes it unnecessary that a switching element with a higher breakdown voltage be used for the switching element Q3. Furthermore, what flows through the diode D3 is only a current for recovering the magnetizing current which flows through the primary winding P2 of the transformer T2 due to the capacitance between the drain and source of the switching element Q3 as well as the recovery current of the body diode. For this reason, a diode with a small current rating can be used as the diode D3. Accordingly, it is possible to use the switching element Q3 which requires no large cost hike or no increase in the packaging area, and which is economical.

EXAMPLE 4

Figure 12:
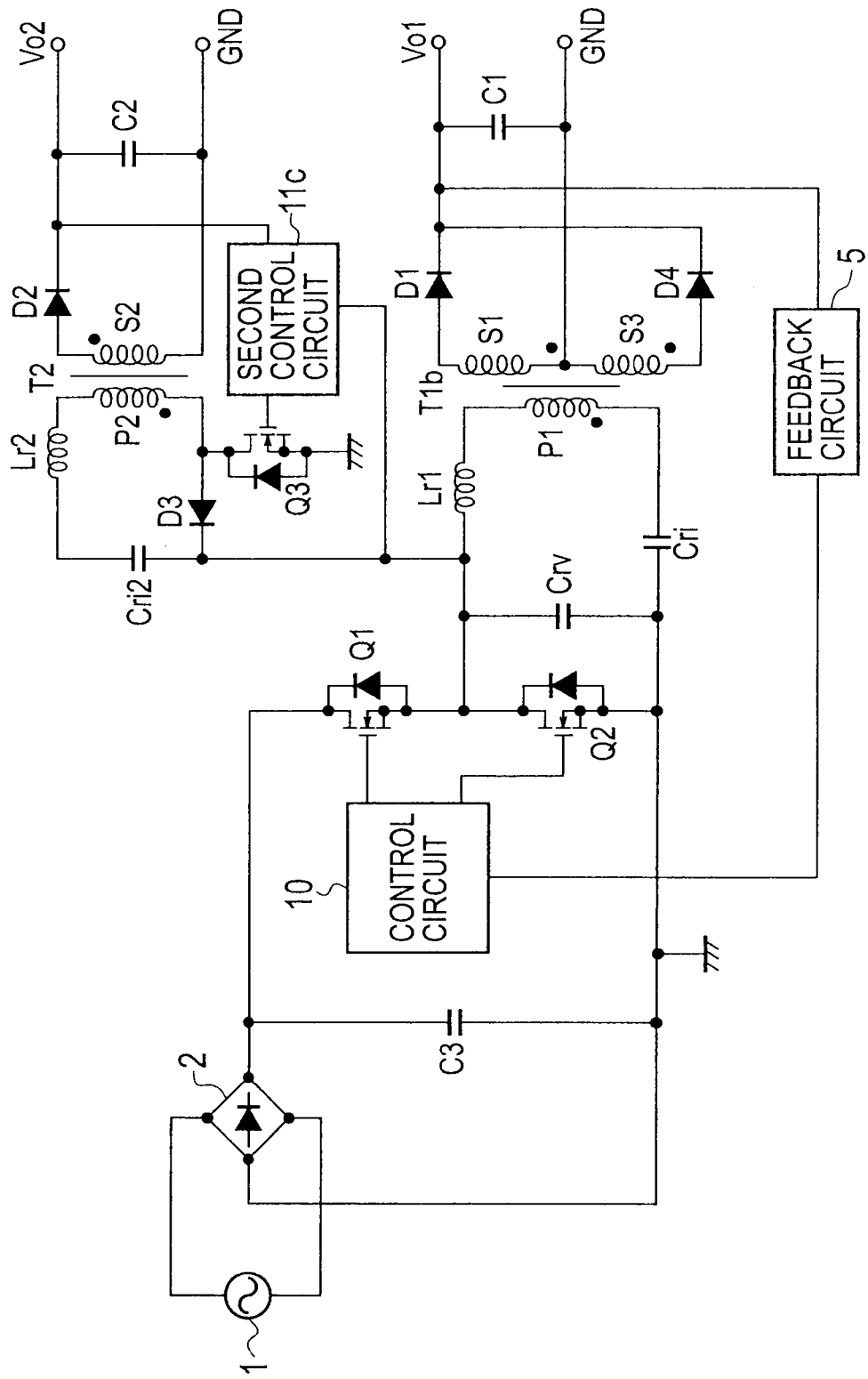
FIG. 12 is a circuit diagram showing a configuration of a multiple-output switching power supply unit according to Example 4 of the present invention.

FIG. 12 is a circuit diagram showing a configuration of a multiple-output switching power supply unit according to Example 4 according to the present invention. In this multiple-output switching power supply unit, compared with the multiple-output switching power supply unit according to Example 3 shown in FIG. 10, a second secondary winding S3 is added to a transformer T1b. A first end of the second secondary winding S3 is connected to the second end of the first secondary winding S1 (GND). Furthermore, a diode D4 whose anode is connected to the second end of the second secondary winding S3, and whose cathode is connected to the cathode of the diode D1, is added to the multiple-output switching power supply unit according to Example 3 shown in FIG. 10. The rest of the configuration of this multiple-output switching power supply unit is the same as the rest of the configuration of the multiple-output switching power supply unit according to Example 3 shown in FIG. 10.

Figure 13:
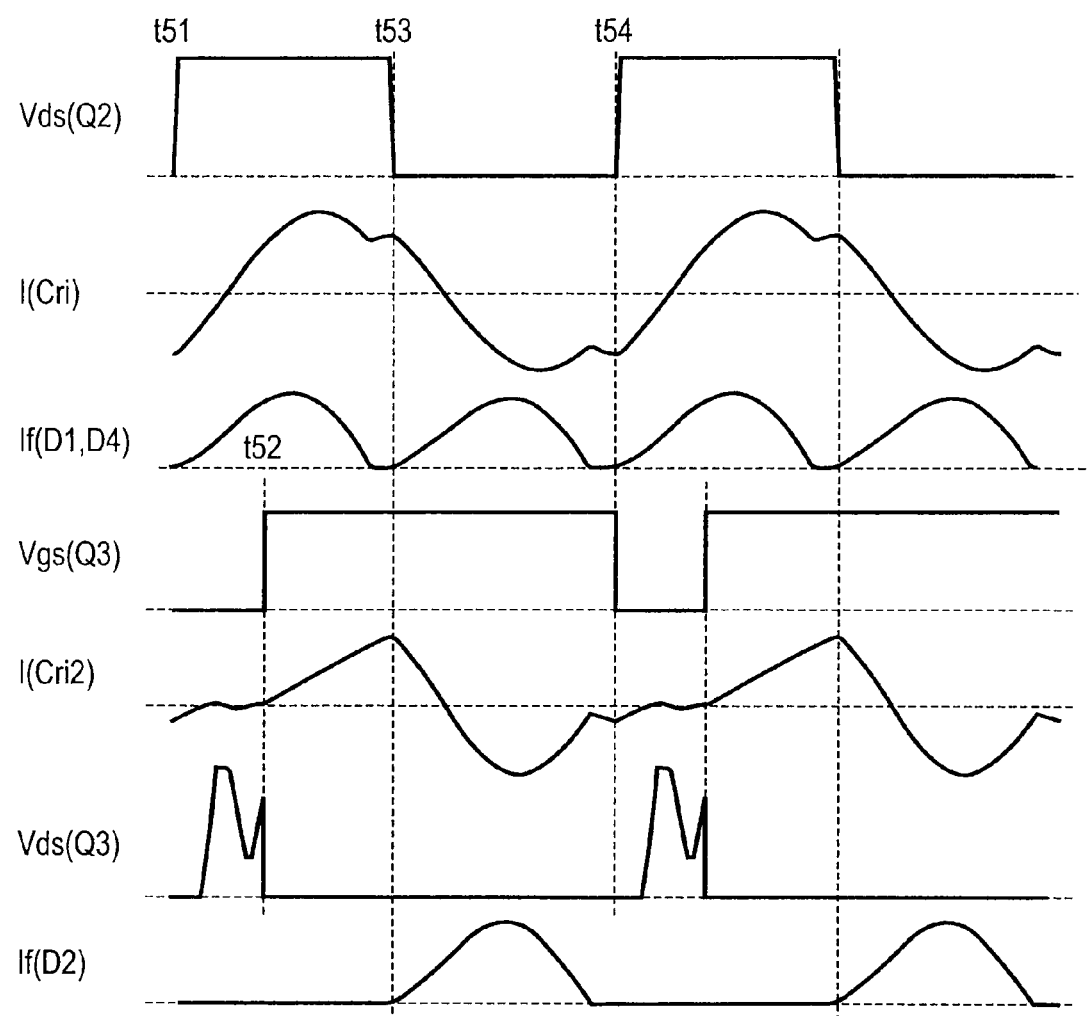
FIG. 13 is a waveform diagram showing how the multiple-output switching power supply unit according to Example 4 of the present invention operates.

Next, descriptions will be provided for how the multiple-output switching power supply unit thus configured according to Example 4 of the present invention operates, referring to a waveform diagram shown in FIG. 13.

A converter which outputs the first output voltage Vo1 is known as a full-wave rectifying-type current resonance converter. The first switching element Q1 and the second switching element Q2 alternately turn on and off with a 50% duty cycle. The first output voltage Vo1 is controlled by the control circuit 10 which controls the frequency and thereby controls the amplitude of the first current resonance capacitor Cri.

First of all, once the first switching element Q1 turns on, the input voltage is applied to the first series resonance circuit. Thus, a voltage equal to the difference between the input voltage and the voltage stored in the first current resonance capacitor Cri is applied to the primary winding P1 of the transformer T1b. Hence, a voltage in a direction which causes the diode D1 to be electrified is generated in the first secondary winding S1 of the transformer T1b. Accordingly, the resonant current generated therein by the first leakage inductance Lri1 and the first current resonance capacitor Cri is supplied to the first output Vo1.

Subsequently, once the first switching element Q1 turns off and the second switching element Q2 turns on, the voltage stored in the first current resonance capacitor Cri is applied to the first winding P1 of the transformer T1b. Thus, a voltage in a direction which causes the diode D4 to be electrified is generated in the second secondary winding S3 of the transformer T1b. Hence, a resonant current generated therein by the first leakage inductance Lri1 and the first current resonance capacitor Cri is supplied to the first output Vo1. In other words, energy transmitted to the first output Vo1 is determined depending on the voltage stored in the first current resonance capacitor.

The first switching element Q1 and the second switching element Q2 alternately turn on and off with a 50% duty cycle. Thereby, in addition to the current to be transmitted to the first output Vo1, a magnetizing current which is generated due to a resonance operation by the first current resonance capacitor Cri and the primary winding P1 of the transformer T1b flows through the first current resonance capacitor Cri. Thus, the voltage of the current oscillates around a voltage which is a half of the input voltage.

The oscillation of this first current resonance capacitor Cri is changed when the switching frequency of each of the switching element Q1 and the switching element Q2 is changed. In other words, when the switching frequency of each of the first switching element Q1 and the second switching element Q2 is changed, it is possible to control the voltage applied to primary winding P1 of the transformer T1b during the on period of each of the first switching element Q1 and the second switching element Q2, and accordingly to control the energy transmitted to the secondary side. Subsequently, voltages generated in the respective secondary windings S1, S3 are rectified and smoothed by the first rectifying/smoothing circuit including the diode D1 and the smoothing capacitor C1. Thus, as the first output voltage Vo1, the resultant voltage is outputted from the first output terminal.

The second output voltage Vo2 is controlled in the same manner as is the second output voltage Vo2 according to Example 3 shown in FIG. 8. For this reason, descriptions for how the second output voltage Vo2 according to Example 4 is controlled will be omitted.

As described above, Example 4 offers the same effect as Example 1 to 3 even in a case where the transformer T1b is a current resonance converter of a secondary-side full-wave rectifier type.

Note the following points. In the case of the multiple-output switching power supply unit according to each of Examples 1 to 4, the first series resonance circuit is connected between the drain and source of the second switching element Q2. However, the multiple-output switching power supply unit in which the first series resonance circuit is instead connected between the drain and source of the first switching element Q1 offers the same effect as the first series resonance circuit is connected between the drain and source of the second switching element Q2. In addition, in the case of the multiple-output switching power supply unit according to each of Examples 1 to 3, the coil of the secondary winding S1 of the transformer T1 is wound in the direction which causes the polarity of the voltage generated in the secondary winding S1 to be opposite to the polarity of the voltage applied to the primary winding P1. However, the multiple-output switching power supply unit in which the coil of the secondary winding S1 of the transformer T1 is instead wound in a direction which causes the polarity of the voltage generated in the secondary winding S1 to be the same as the polarity of the voltage applied to the primary winding P1 offers the same effect.

Furthermore, in the case of the multiple-output switching power supply unit according to each of Examples 2 to 4, the synchronization is made by detecting the rise edge of the voltage between the drain and source of the switching element Q2. However, the multiple-output switching power supply unit in which the synchronization is made by doing things such as detecting, instead, the fall edge of the voltage between the gate and source of the switching element Q2 offers the same effect.

Moreover, the multiple-output switching power supply unit according to each of Examples 1 to 4 is applied to the converter configured to output the first output voltage by use of the current resonance converter of the secondary-side half-wave rectifier type or the secondary-side full-wave rectifier type. However, the multiple-output switching power supply unit applied to a converter configured to output the first output voltage by use of a flyback converter or a forward converter offers the same effect.

EXAMPLE 5

Figure 14:
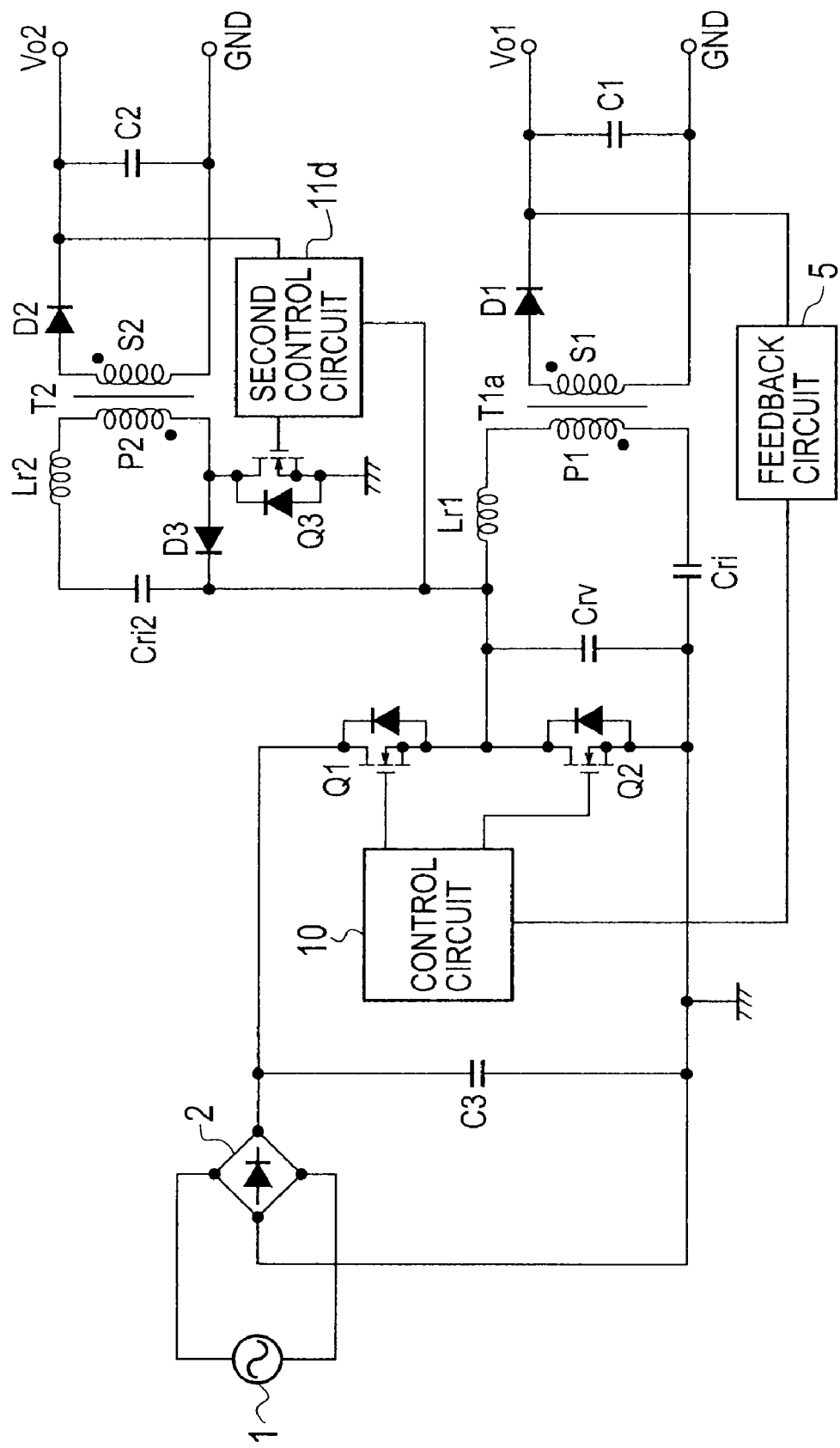
FIG. 14 is a circuit diagram showing a configuration of a multiple-output switching power supply unit according to Example 5 of the present invention.

FIG. 14 is a circuit diagram showing a configuration of a multiple-output switching power supply unit according to Example 5 of the present invention. Example 5 shown in FIG. 14 is different from Example 3 shown in FIG. 10 in that Example 5 uses a second control circuit 11d configured to turn on the switching element Q3 in synchronism with the rise of the pulse voltage, and to control the period of time for which the switching element Q3 is on based on the second output voltage Vo2. The rest of the configuration of Example 5 is the same as the rest of the configuration of Example 3.

The second control circuit 11d is connected to the connection point between the switching element Q1 and the switching element Q2. Thus, the second control circuit 1id detects the rise of the voltage between the drain and source of the switching element Q2, and hence outputs an on signal to the gate terminal of the switching element Q3.

Figure 15:
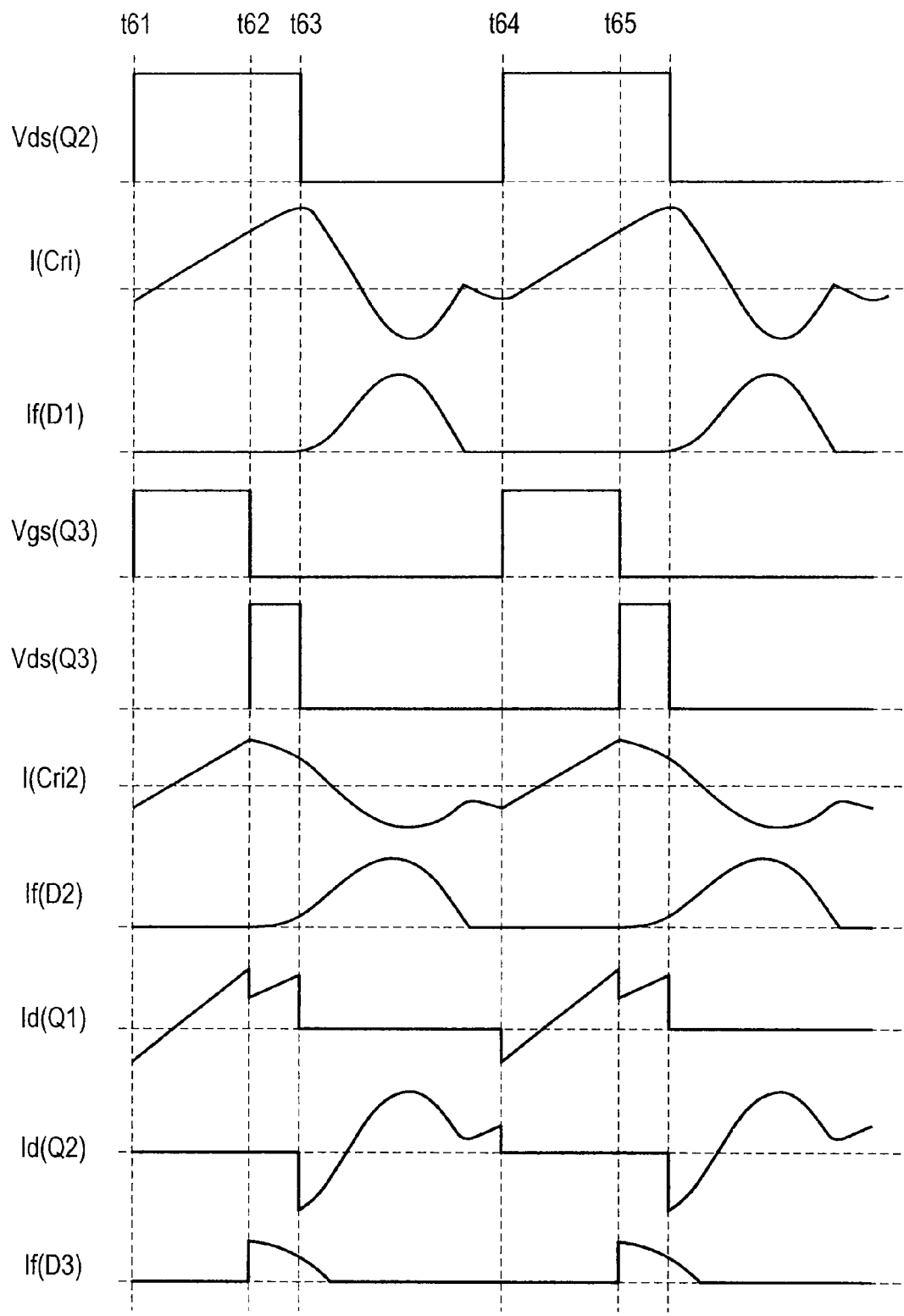
FIG. 15 is a waveform diagram showing how the multiple-output switching power supply unit according to Example 5 of the present invention operates.

Next, descriptions will be provided for how the multiple-output switching power supply unit according to Example 5 of the present invention operates, referring to a waveform diagram shown in FIG. 15.

The first output voltage is controlled in the same manner as is the first output voltage Vo1 according to Example 1. For this reason, descriptions for how the first output voltage according to Example 5 is controlled will be omitted.

The second output voltage Vo2 is controlled as follows. First of all, once the switching element Q1 turns on (at time t61), the gate signal is simultaneously applied to the gate of the switching element Q3 from the second control circuit 11d, and the switching element Q3 thus turns on (at time t62). At this time, the magnetizing current flows to the second series resonance circuit through a path from the smoothing capacitor C3, the switching element Q1, the second current resonance capacitor Cri2, and the primary winding P2 of the transformer T2 to the switching element Q3. Accordingly, the second current resonance capacitor Cri2 is charged.

Subsequently, once the on period of the switching element Q1 exceeds a predetermined length of time, the gate signal applied to the switching element Q3 turns to L level. Once the switching element Q3 turns off (at time t62), the voltage of the transformer T2 reverses. For this reason, the resonant current of the second series circuit flows through a path from the second current resonance capacitor Cri2 and the primary winding P2 of the transformer T2 to the diode D3. Thus, the resonant current is discharged to the secondary side of the transformer T2 through the diode D2.

Thereafter, once the switching element Q1 turns off and the switching element Q2 turns on (at time t63), the current flowing through the second series resonance circuit flows in a path from the second current resonance capacitor Cri2, the switching element Q2, and the body diode of the switching element Q3 to the primary winding P2 of the transformer T2. The second series resonance circuit continues operating in the same manner as the second series resonance circuit operates during the period from time t62 through time t63. For this reason, the resonant current continues being discharged to the secondary side of the transformer T2 through the diode D2.

After that, once the switching element Q2 turns off and the switching element Q1 turns on (at time t64), the switching element Q3 turns on as at time t61. Subsequently, the foregoing operation is repeated.

Furthermore, in the case where the load is changed, or in the case where the output voltage is made variable, the second control circuit 11d controls the period of time for which the switching element Q3 is on based on a feedback signal from the second output voltage Vo2. Thereby, the voltage with which the second current resonance capacitor Cri2 is charged is changed. Accordingly, it is possible to control the energy which is transmitted to the second output Vo2.

EXAMPLE 6

Figure 16:
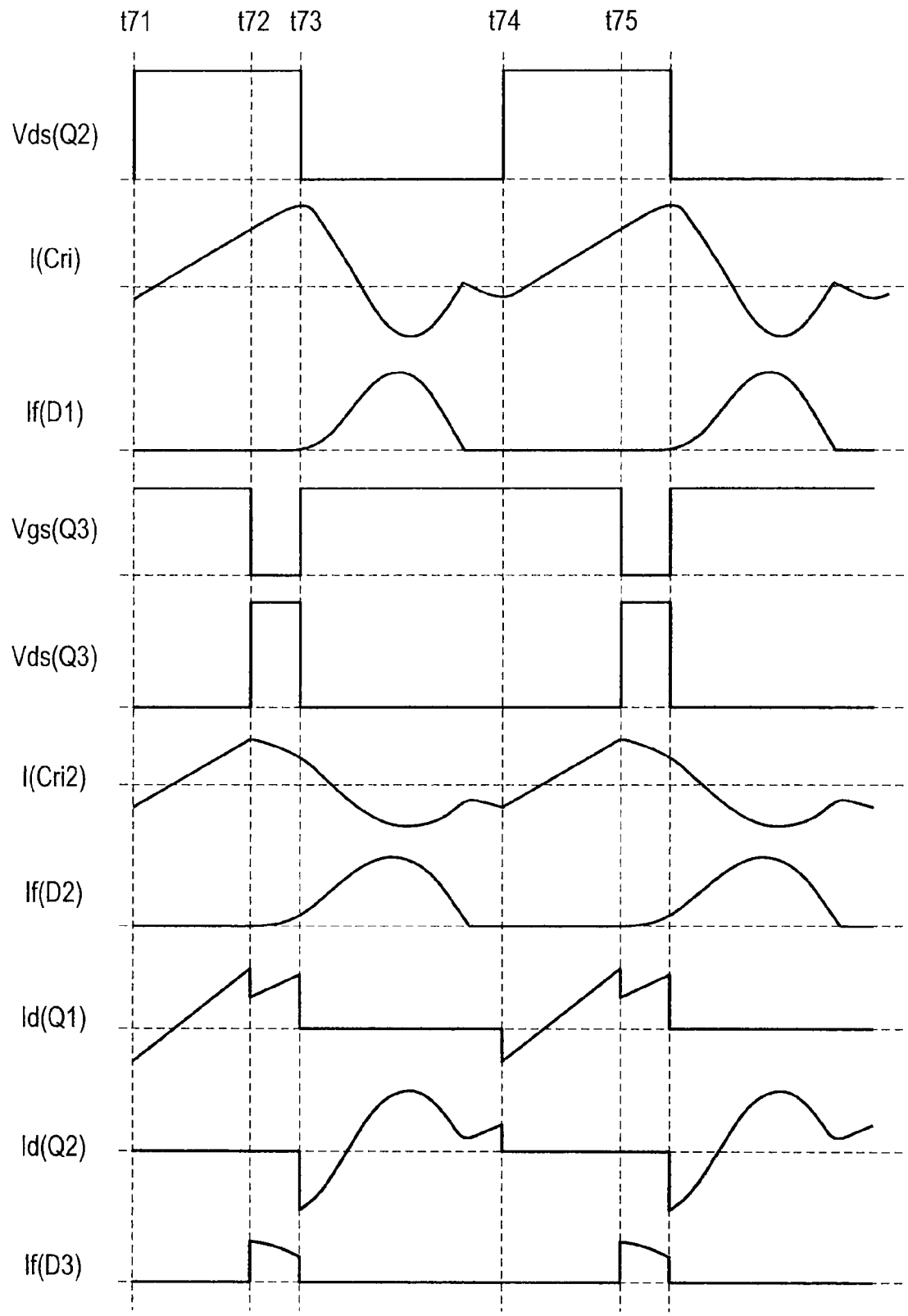
FIG. 16 is a waveform diagram showing how a multiple-output switching power supply unit according to Example 6 of the present invention operates.

FIG. 16 is a waveform diagram showing how a multiple-output switching power supply unit according to Example 6 of the present invention operates. The circuit configuration of the multiple-output switching power supply unit according to Example 6 is almost the same as the circuit configuration of the multiple-output switching power supply unit according to Example 5 shown in FIG. 14. The multiple-output switching power supply unit according to Example 6 is different from the multiple-output switching power supply unit according to Example 5 shown in FIG. 14 in terms of the function of the second control circuit 11d.

The function of the second control circuit 11d according to Example 6 is different from the function of the second control circuit 11d according to Example 5 in that the second control circuit 11d according to Example 6 applies the gate signal to the switching element Q3 in synchronism with the fall of the voltage of the voltage resonance capacitor Crv whereas the second control circuit 11d according to Example 5 applies the gate signal to the switching element Q3 in synchronism with the rise of the voltage of the voltage resonance capacitor Crv.

In the case of Example 5, after the switching element Q3 turns off, the current I(Cri2) of the second series resonance circuit flows as the current If(D3) through the diode D3 until the direction of the current turns from positive to negative.

On the contrary, in the case of Example 6, once the switching element Q2 turns on, the switching element Q3 turns on (at time t73). For this reason, after the switching element Q3 turns on, the resonant current flows through the switching element Q3, and the current stress of the diode D3 accordingly decreases.

In addition, in the case of Example 5, after the direction of the resonant current turns from positive to negative, the resonant current flows through the body diode of the switching element Q3. In general, the loss which occurs due to the on resistance of the MOSFET is smaller than the loss which occurs due to the drop of the voltage of the body diode in the forward direction. For this reason, by turning on the switching element Q3, it is possible to reduce the loss which occurs when the resonant current flows through the switching element Q3.

Note that the present invention is not limited to the multiple-output switching power supply units respectively according to Examples 1 to 6. For instance, the second control circuit 11a according to Example 2 is configured to: turn on the switching element Q3 while the pulse voltage is applied; turn off the switching element Q3 in synchronism with the rise of the pulse voltage; and thereby control the period of time for which the switching element Q3 is off based on the second output Vo.2.

For instance, however, the control circuit may be configured to: turn on the switching element Q3 while the pulse voltage is applied; turn off the switching element Q3 after a predetermined length of time passes while no pulse voltage is applied; and thereby control the period of time for which the switching element Q3 is off based on the second output Vo1.

In this case, the control circuit turns off the switching element Q3 once the predetermined length of time passes while no inputted pulse voltage is being applied, and turns on the switching element Q3 once the predetermined length of time passes while the pulse voltage is being applied. For this reason, by controlling the off period of the switching element Q3 once the pulse voltage is applied, it is possible to control the magnetizing current of the transformer T2, that is, the charging current of the current resonance capacitor Cri2.

Thereby, the second output Vo2 obtained by rectifying and smoothing a pulse voltage which is generated in the secondary winding S2 of the transformer T2 is controlled. In addition, while no pulse voltage is being applied, the energizing energy of the transformer T2 is reset, and the transformer T2 is subsequently reversely energized by the resonance current which occurs due to the discharge of the current resonance capacitor Cri2. Because this resonant current flows through the body diode of the switching element Q3, the switching element Q3 is turned off during this period of time. Accordingly, no switching loss occurs because no voltage is applied to the switching element Q3.

Moreover, because the control circuit controls, based on the second output Vo2, the period of time for which the switching element Q3 is off, it is possible to stabilize the output even if the load fluctuates.

Industrial Applicability

The present invention can be applied to power supply units including an AC-DC converter.

The invention claimed is:

1. A multiple-output switching power supply unit comprising:
   a voltage generating circuit configured to generate a pulse voltage by intermittently interrupting a direct current power supply, a first switching element and a second switching element which are connected in series between two terminals of the direct current power supply, the first switching element and the second switching element being configured to generate the pulse voltage by turning on and off;
   and a first series resonance circuit which includes a primary winding of a first transformer and a first current resonance capacitor, the first series resonance circuit being connected in parallel to any one of the first switching element and the second switching element;
   a second series resonance circuit including a second current resonance capacitor, a primary winding of a second transformer and a third switching element, the second series resonance circuit configured to connect in series between an input terminal and a ground, any one of the pulse voltage generated by turning on and off the first switching element and the second switching element, and the pulse voltage generated in the first transformer being applied to the input terminal;
   a rectifying/smoothing circuit configured to rectify and smooth a voltage which is generated in a secondary winding of the transformer, and to output a direct current output voltage; and
   a control circuit configured to turn on and off the third switching element based on the direct current output voltage.

2. The multiple-output switching power supply unit according to claim 1, wherein
   the control circuit turns on the third switching element while the pulse voltage is applied,
   the control circuit turns off the third switching element in synchronism with a start time of an applied period of the pulse voltage, and
   the control circuit controls a period of time for which the third switching element is off, based on the direct current output voltage.

3. The multiple-output switching power supply unit according to claim 1, wherein
   the control circuit turns on the third switching element while the pulse voltage is being applied,
   the control circuit turns off the third switching element once a predetermined time passes during a period in which no pulse voltage is being applied, and
   the control circuit controls a period of time for which the third switching element is off, based on the direct current output voltage.

4. The multiple-output switching power supply unit according to claim 1, wherein
   a recovery diode is connected in parallel to said second series circuit which includes the current resonance capacitor and a primary winding of the second transformer in the second series resonance circuit.

5. The multiple-output switching power supply unit according to claim 4, wherein
   the control circuit turns on the third switching element in synchronism with a fall of the pulse voltage, and
   the control circuit controls a period of time for which the third switching element is on, based on the direct current output voltage.

6. The multiple-output switching power supply unit according to claim 4, wherein
   the control circuit turns on the third switching element in synchronism with a rise of the pulse voltage, and
   the control circuit controls a period of time for which the third switching element is on, based on the direct current output voltage.

* * * * *